(12) United States Patent
Bowen

(10) Patent No.: US 6,679,799 B2
(45) Date of Patent: *Jan. 20, 2004

(54) ON-DEMAND TWO-SPEED TRANSFER CASE FOR FOUR-WHEEL DRIVE HYBRID VEHICLE

(75) Inventor: Thomas C. Bowen, Rochester Hills, MI (US)

(73) Assignee: New Venture Gear, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/429,395

(22) Filed: May 5, 2003

(65) Prior Publication Data

US 2003/0195075 A1 Oct. 16, 2003

Related U.S. Application Data

(63) Continuation of application No. 10/000,196, filed on Nov. 2, 2001, now Pat. No. 6,589,128.

(51) Int. Cl.[7] .............................. F16H 3/72; F16H 37/06
(52) U.S. Cl. .......................................... 475/5; 180/65.2
(58) Field of Search ......................... 475/5, 6; 180/65.2

(56) References Cited

U.S. PATENT DOCUMENTS

| 6,041,877 A | 3/2000 | Yamada et al. |
|---|---|---|
| 6,048,289 A | 4/2000 | Hattori et al. |
| 6,059,064 A | 5/2000 | Nagano et al. |
| 6,083,138 A | 7/2000 | Aoyama et al. |
| 6,083,139 A | 7/2000 | Deguchi et al. |
| 6,098,733 A | 8/2000 | Ibaraki et al. |
| 6,110,066 A | 8/2000 | Nedungadi et al. |
| 6,116,363 A | 9/2000 | Frank |
| 6,146,302 A | 11/2000 | Kashiwase |
| 6,464,608 B2 | 10/2002 | Bowen et al. |
| 6,533,692 B1 | 3/2003 | Bowen |
| 6,533,693 B2 | 3/2003 | Bowen et al. |

*Primary Examiner*—Dirk Wright
(74) *Attorney, Agent, or Firm*—Harness, Dickey & Pierce P.L.C.

(57) ABSTRACT

A hybrid transfer case includes a mainshaft, front and rear output shafts, an electric motor/generator connected to the mainshaft, and an input clutch for selectively coupling the transmission to the mainshaft. The transfer case further includes a planetary gearset having a sun gear driven by the mainshaft, a ring gear, and planet gears supported from a carrier. A direct clutch is operable to selectively couple the rear output shaft for rotation with the input shaft. A low brake is operable to selectively brake rotation of the ring gear. A transfer clutch controls the amount of drive torque delivered through a transfer assembly to the front output shaft. A hybrid control system is provided for controlling actuation of the various clutch and brake assemblies and the electric motor/generator to establish various drive modes.

39 Claims, 18 Drawing Sheets

| MODE | INPUT CLUTCH | DIRECT CLUTCH | LOW BRAKE | MOTOR/ GENERATOR |
|---|---|---|---|---|
| ELECTRIC LOW | RELEASED | RELEASED | APPLIED | DRIVING |
| HYBRID LOW | APPLIED | RELEASED | APPLIED | DRIVING |
| ENGINE LOW | APPLIED | RELEASED | APPLIED | OFF OR CHARGING |
| HYBRID DIRECT | APPLIED | APPLIED | RELEASED | DRIVING |
| ENGINE DIRECT | APPLIED | APPLIED | RELEASED | OFF OR CHARGING |
| REGENERATIVE BRAKE LOW | APPLIED OR RELEASED | RELEASED | APPLIED | CHARGING |
| REGENERATIVE BRAKE DIRECT | APPLIED | APPLIED | RELEASED | CHARGING |
| POWER GENERATION | APPLIED | RELEASED | RELEASED | CHARGING |

FIG. -9

POWER FLOW IN ELECTRIC LOW - 2WD

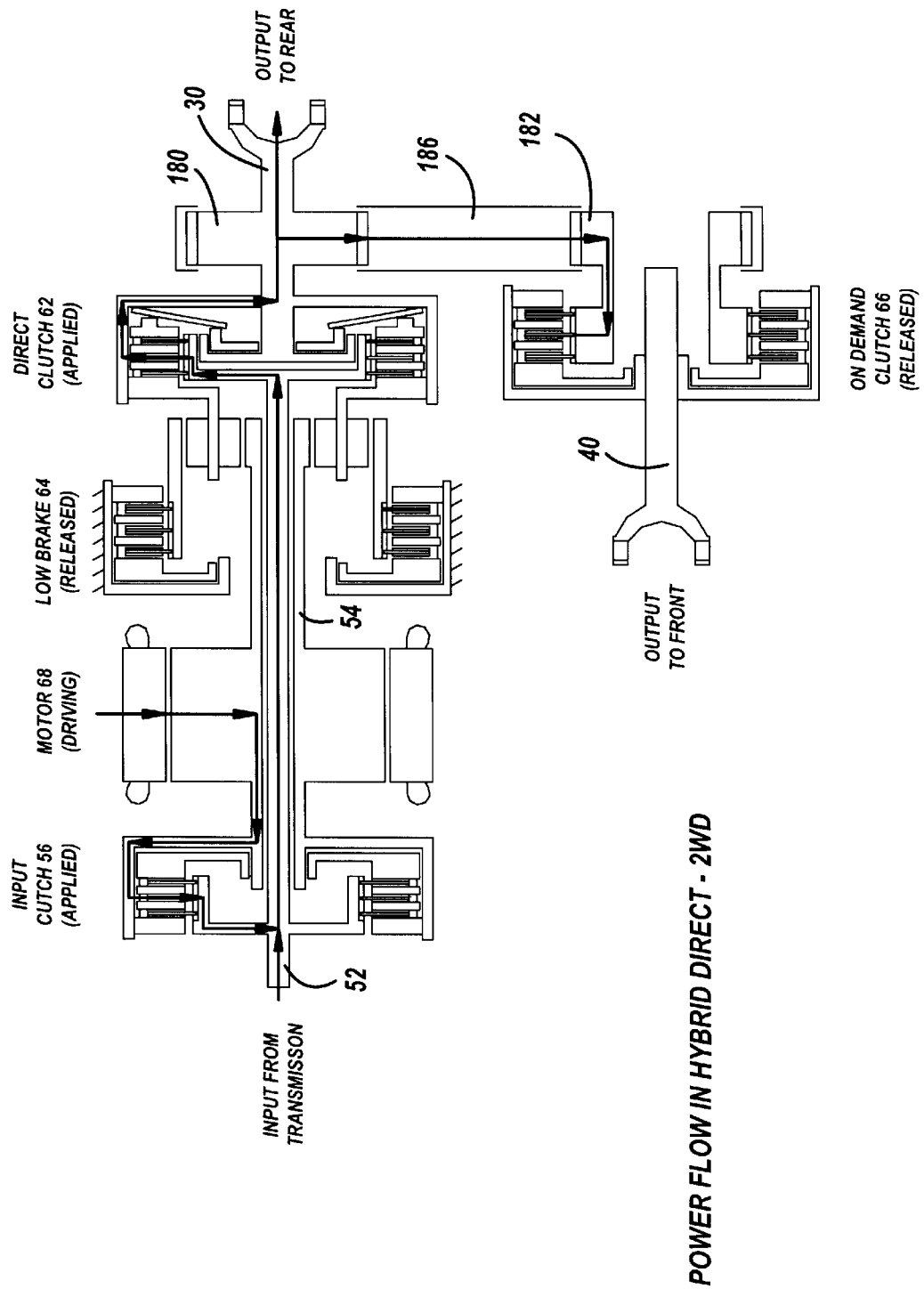

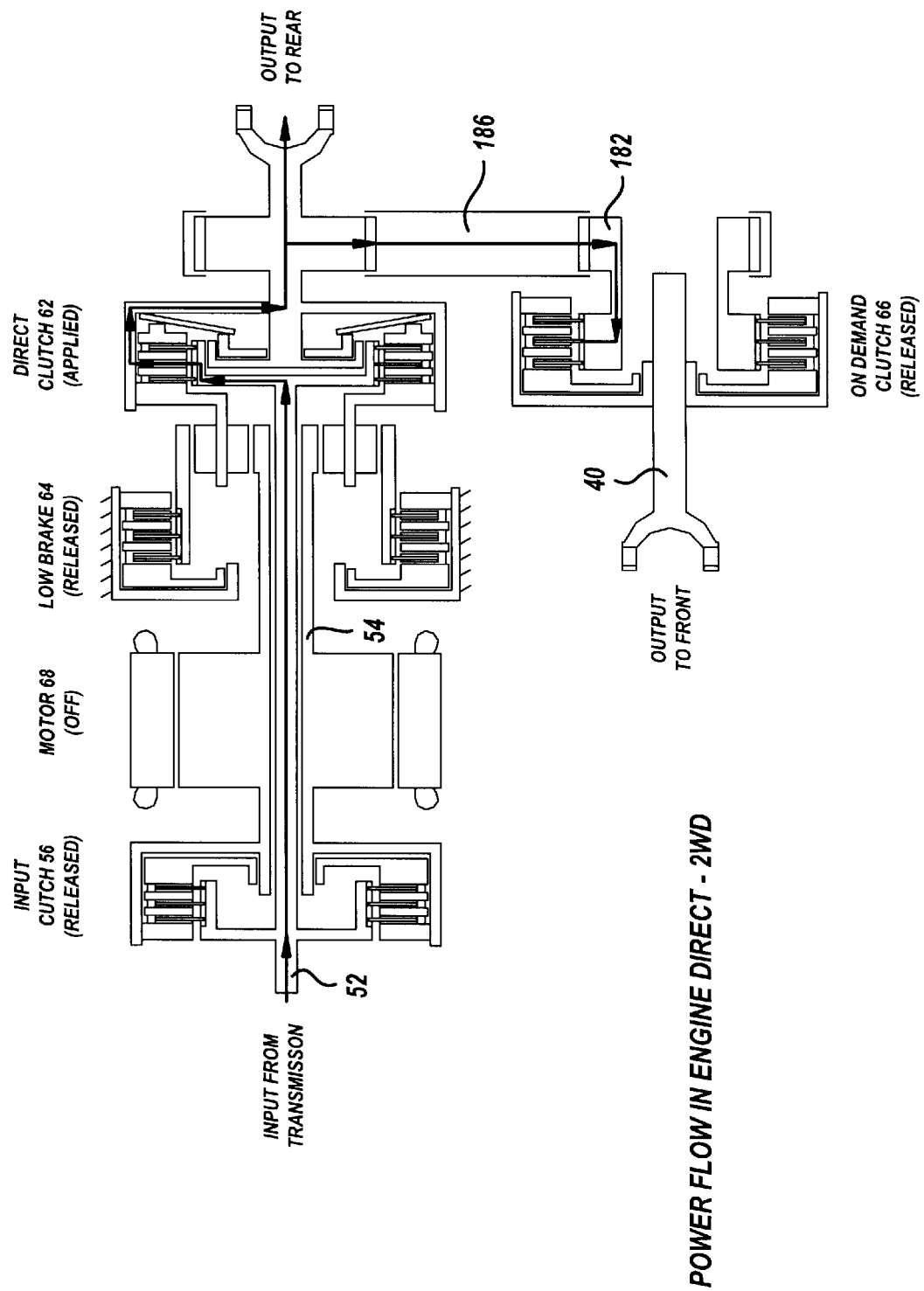

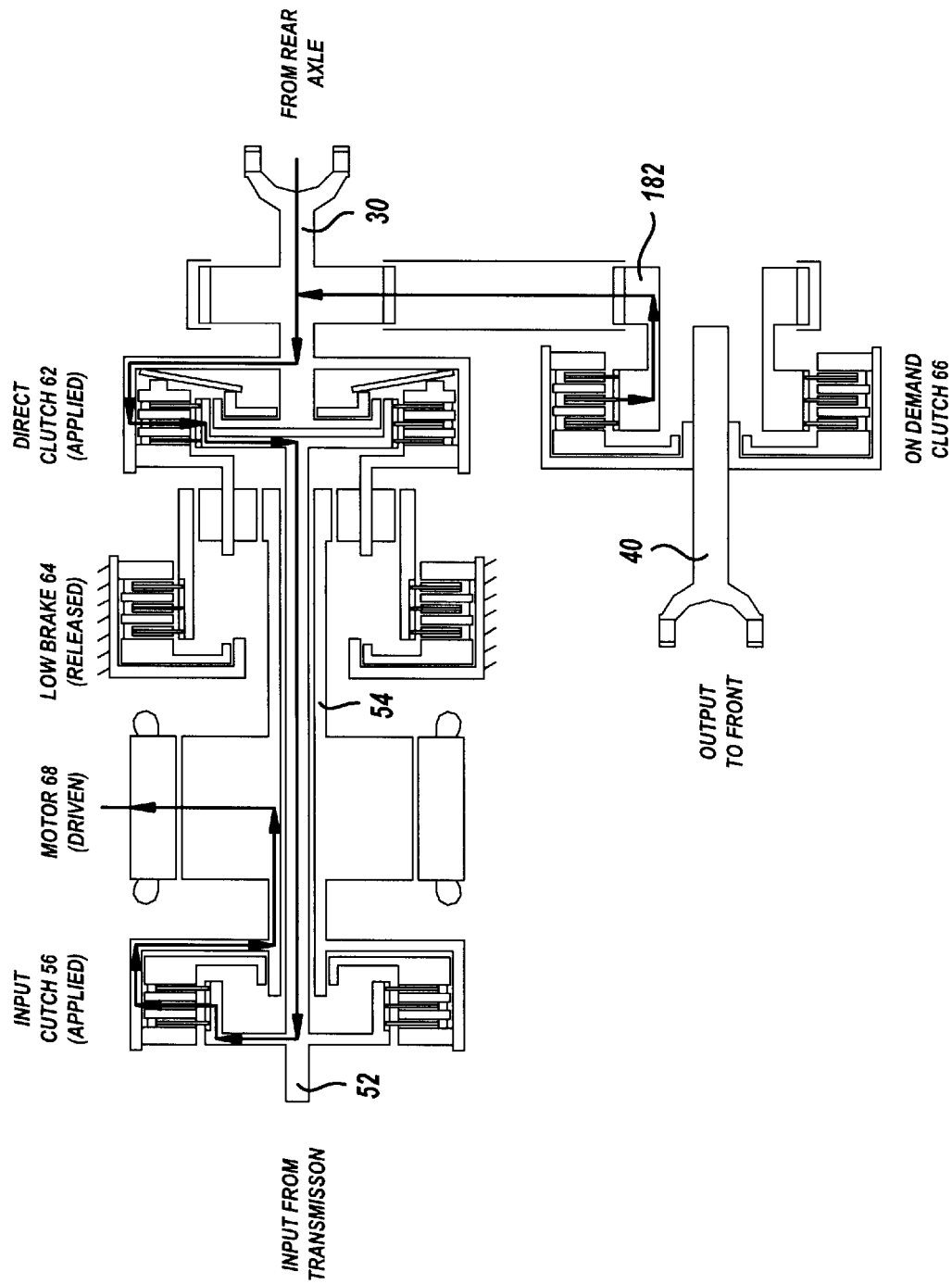

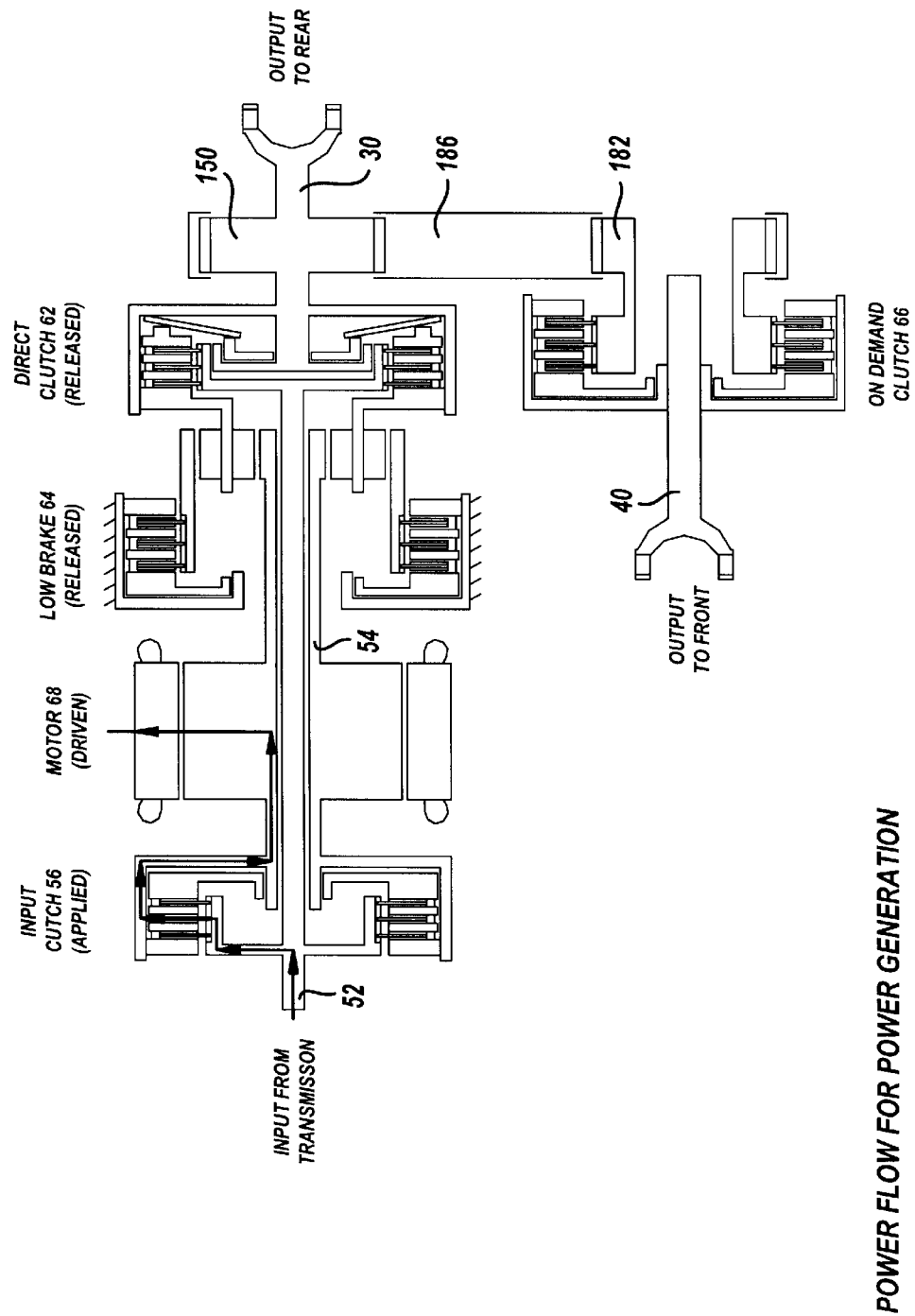

POWER FLOW FOR SHIFTING ASSIST (DIRECT MODE)

ON-DEMAND TWO-SPEED TRANSFER CASE FOR FOUR-WHEEL DRIVE HYBRID VEHICLE

CROSS-REFERENCE TO RELATED APPLICATIONS

This application is a continuation of U.S. patent application Ser. No. 10/000,196 filed on Nov. 2, 2001 now U.S. Pat. No. 6,586,128.

FIELD OF THE INVENTION

The present invention relates generally to hybrid drive systems for motor vehicles, and, more specifically, to a hybrid transfer case for use in four-wheel drive vehicles.

BACKGROUND OF THE INVENTION

Automobile manufacturers are actively working to develop alternative powertrain systems in an effort to reduce the level of pollutants exhausted into the air by conventional powertrains equipped with internal combustion engines. Significant development has been directed to electric vehicles and fuel cell vehicles. Unfortunately, these alternative powertrain systems suffer from several disadvantages and, for all practical purposes, are still under development. However, several different hybrid electric vehicles (HEV) have recently been offered for sale. These hybrid vehicles are equipped with an internal combustion engine and an electric motor that can be operated independently or in combination to drive the vehicle.

There are two types of hybrid vehicles, namely, series hybrid and parallel hybrid. In a series hybrid vehicle, power is delivered to the wheels by the electric motor which draws electrical energy from the battery. The engine is used in series hybrid vehicles to drive a generator which supplies power directly to the electric motor or charges the battery when the state of charge falls below a predetermined value. In parallel hybrid vehicles, the electric motor and the engine can be operated independently or in combination pursuant to the running conditions of the vehicle. Typically, the control strategy for such parallel hybrid vehicles utilizes a low-load mode where only the electric motor is used to drive the vehicle, a high-load mode where only the engine is used to drive the vehicle, and an intermediate assist mode where the engine and electric motor are both used to drive the vehicle. Regardless of the type of hybrid drive system used, hybrid vehicles are highly modified versions of conventional vehicles that are expensive due to the componentry, required control systems, and specialized packaging requirements.

Hybrid vehicles have also been adapted to four-wheel drive vehicles and typically utilize the above-noted parallel hybrid powertrain to drive the primary wheels and a second electric motor to drive the secondary wheels. Obviously, such a four-wheel drive system is not only extremely expensive and difficult to package, but is also difficult to control in view of the need to react to instantaneous instances of wheel slip. Thus, a need exists to develop hybrid powertrains for use in four-wheel drive vehicles that utilize many conventional powertrain components so as to minimize specialized packaging and reduce cost.

SUMMARY OF THE INVENTION

It is therefore an object of the present invention to provide a hybrid powertrain or drive system for a four-wheel drive vehicle.

In accordance with another object, the four-wheel drive hybrid drive system of the present invention includes a transfer case adapted for conventional connection between the transmission and the front and rear drivelines of the motor vehicle.

According to yet another object, the four-wheel drive hybrid drive system is a parallel-type system with an input clutch and an electric motor/generator integrated into the transfer case.

As a related object, the hybrid drive system of the present invention permits use of the internal combustion engine and the electric motor/generator separately or in combination as power sources for driving the motor vehicle.

As a further object, the hybrid drive system of the present invention utilizes a transfer case having a two-speed planetary gearset which can provide a direct high-range drive ratio and a reduction low-range drive ratio in any of the available (i.e., electric only, internal combustion engine only and hybrid) drive modes.

These and other objects are provided by a hybrid two-speed transfer case having a mainshaft, a rear output shaft, a front output shaft, an electric motor/generator connected to the mainshaft, and an input clutch assembly operable for selectively coupling the transmission output shaft to the mainshaft. The transfer case further includes a planetary gearset having a sun gear driven by the mainshaft, a ring gear, and planet gears supported from a carrier that are meshed with the sun gear and the ring gear. The carrier is arranged to drive a rear output shaft and a drive sprocket of a transfer assembly which also includes a driven sprocket and a power chain connecting the sprockets. A direct clutch assembly is operable in an applied state to couple the carrier for rotation with the mainshaft and is further operable in a released state to permit relative rotation therebetween. A low brake assembly is operable in an applied state to prevent rotation of the ring gear and is further operable in a released state to permit rotation of the ring gear. Finally, a transfer clutch assembly is operably disposed between the driven sprocket and the front output shaft to control the amount of drive torque delivered through the transfer assembly to the front driveline. A hybrid control system including various sensors and a controller are provided for controlling actuation of the various clutch, brake assemblies and the electric motor/generator to permit establishment of various drive modes. These drive modes include an "electric" mode where all motive power is generated by the motor/generator unit, an "engine" mode where all motive power is generated by the internal combustion engine, and a "hybrid" mode where the motive power is generated by both the electric motor/generator and the internal combustion engine. In one preferred arrangement, the hybrid control system includes a hydraulic fluid pressure control system that is integrated into the transfer case and which is operable to control actuation of the various clutch and brake assemblies.

Further areas of applicability of the present invention will become apparent from the detailed description provided hereinafter. It should be understood that the detailed description and specific examples, while indicating preferred embodiments of the present invention, are intended for purposes of illustration only since various changes and modifications within the scope of this particular invention will become apparent to those skilled in the art.

BRIEF DESCRIPTION OF THE DRAWINGS

FIG. 9 is a schematic diagram showing the hybrid powertrain control system associated with the present invention;

FIGS. 11A through 11H are schematic illustrations of the transfer case indicating power flow paths for the various operational modes.

DETAILED DESCRIPTION OF THE PREFERRED EMBODIMENT

Figure 1:
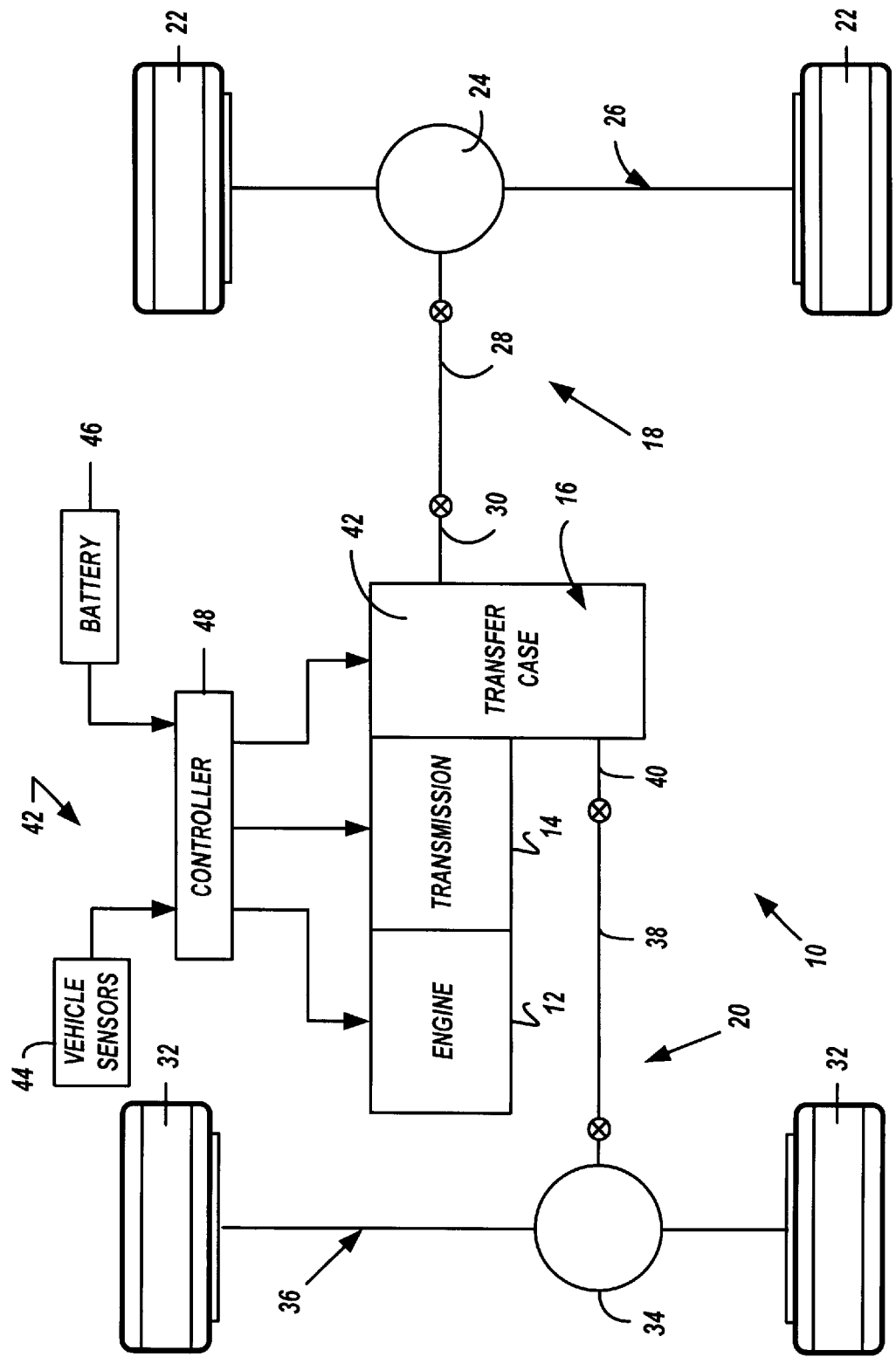
FIG. 1 is a schematic view showing a hybrid powertrain for a four-wheel drive vehicle in accordance with the present invention.
Figure 2:
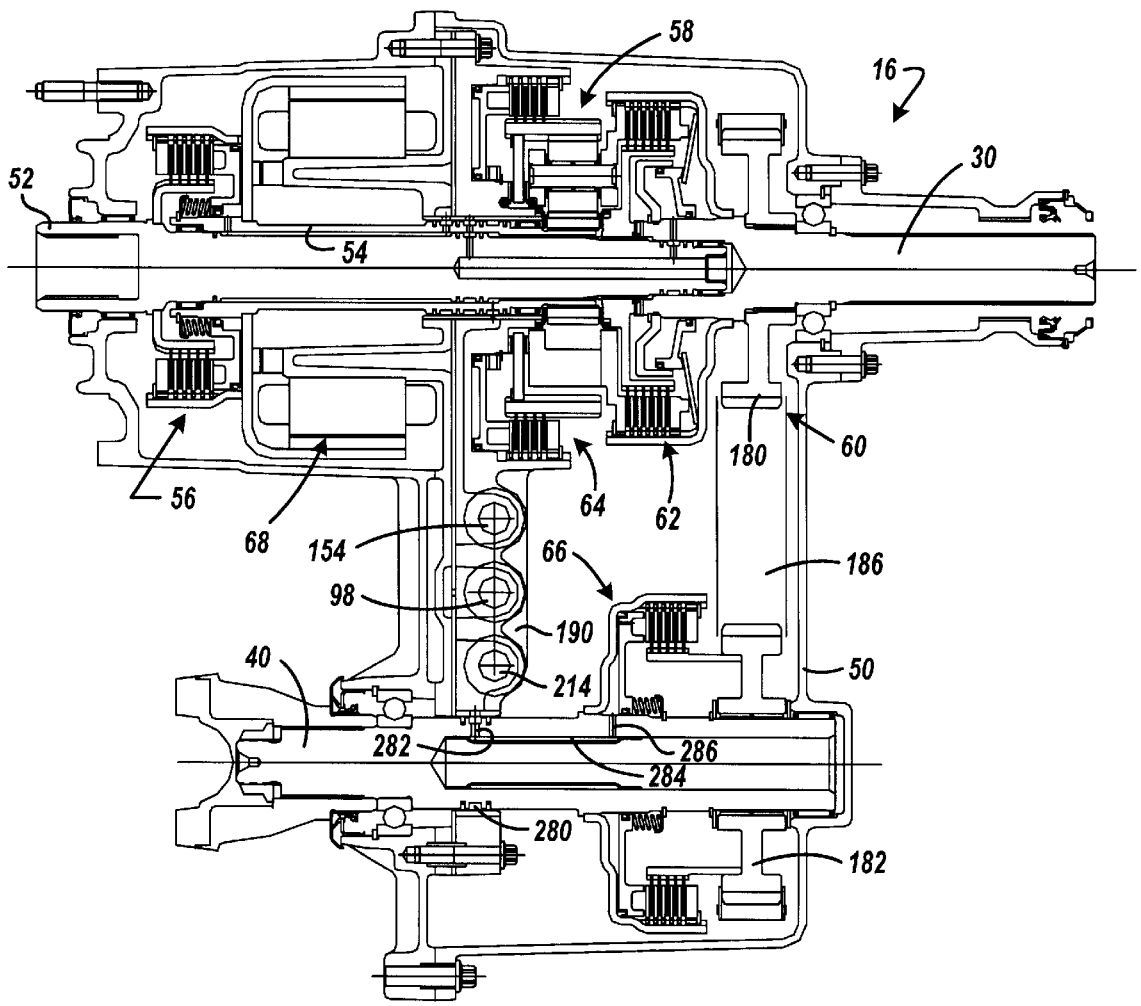
FIG. 2 is a sectional view of the transfer case associated with the hybrid powertrain shown in FIG. 1.

Referring to FIG. 1 of the drawings, a four-wheel drive powertrain 10 for a hybrid motor vehicle is shown to include an internal combustion engine 12, a transmission 14 and a transfer case 16 arranged to transferred motive power (i.e., drive torque) from engine 12 and transmission 14 to a primary driveline 18 and a secondary driveline 20. In the particular arrangement shown, primary driveline 18 is the rear driveline and includes a pair of rear wheels 22 connected to a rear differential unit 24 associated with a rear axle assembly 26. A rear prop shaft 28 interconnects rear differential unit 24 to a rear output shaft 30 of transfer case 16. Secondary driveline 20 is the front driveline and includes a pair of front wheels 32 connected to a front differential unit 34 associated with a front axle assembly 36. A front prop shaft 38 interconnects differential unit 34 to a front output shaft 40 of transfer case 16. Powertrain 10 is also shown to be associated with a powertrain control system 42 generally shown to include an array of vehicle sensors 44, a battery 46 and a controller 48. As will be detailed, controller 48 is operable, among other things, to control actuation of two major sub-systems integrated into transfer case 16. These sub-systems include an electric motor/generator unit and a hydraulic clutch and brake control system.

Referring primarily to FIGS. 2 through 7, the components of transfer case 16 are shown in sufficient detail to provide a clear understanding of its construction and operation. To this end, transfer case 16 is shown to include a housing 50, an input shaft 52 driven by the output shaft of transmission 14, a mainshaft 54, and an input clutch assembly 56 operably disposed between input shaft 52 and mainshaft 54. Transfer case 16 further includes a planetary gearset 58 having an input member driven by mainshaft 54 and an output member adapted to drive rear output shaft 30, and a transfer assembly 60. A direct clutch assembly 62 is shown operably disposed between the output member of planetary gearset 58 and input shaft 52. In addition, a low brake assembly 64 is shown operably disposed between a reaction member of planetary gearset 58 and a portion of housing 50, transfer case 16 also include a transfer clutch assembly 66 that is operably disposed between transfer assembly 60 and front output shaft 40. Finally, an electric motor/generator (M/G) unit 68 is shown to include a stator 70 fixed to housing 50 and a rotor 72 fixed to mainshaft 54.

Figure 3:
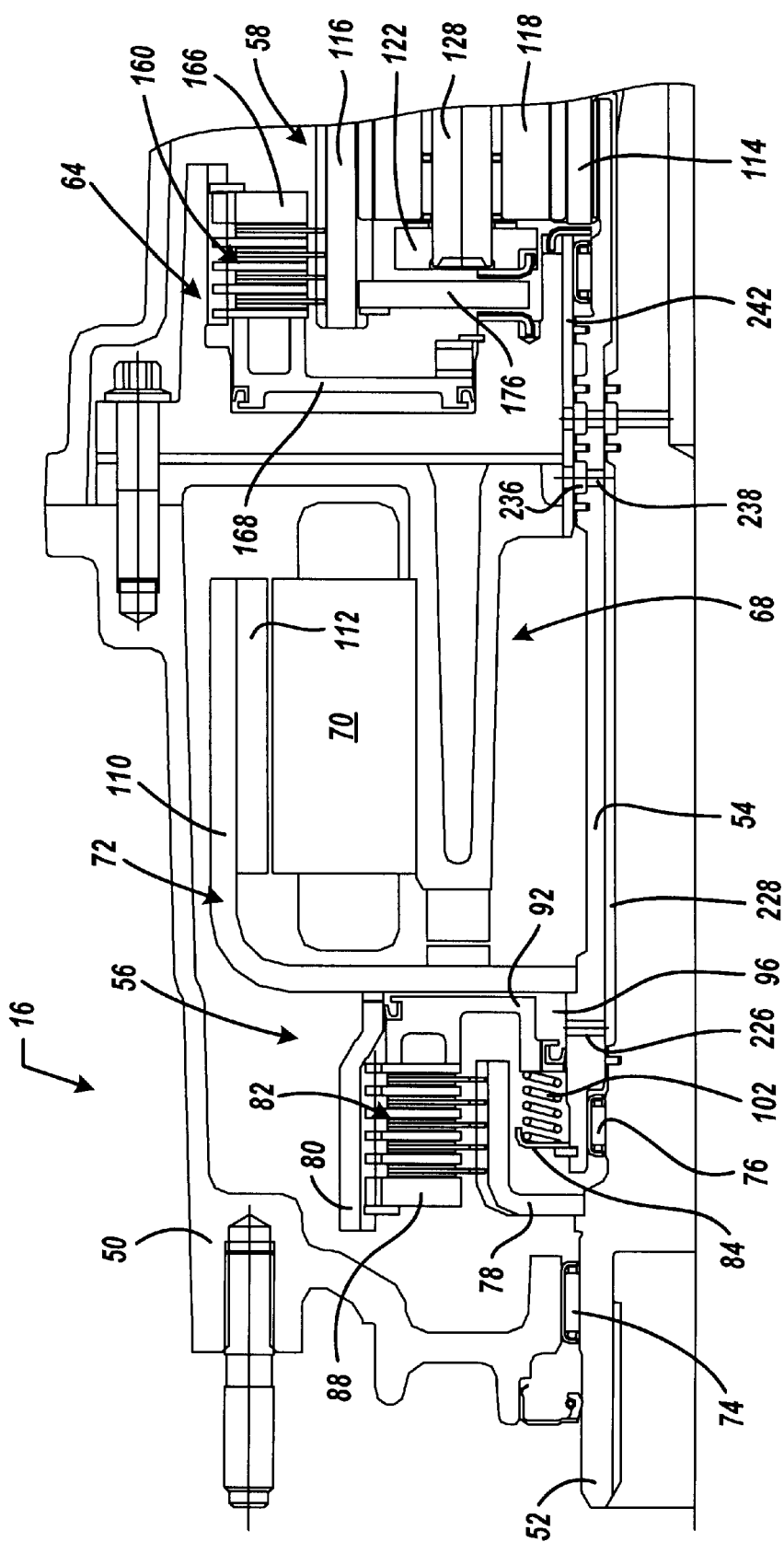
FIG. 3 is an enlarged partial sectional view showing the input clutch assembly in greater detail.

As best seen from FIG. 3, input shaft 52 is rotatably supported from housing 50 by a bearing assembly 74 and a forward end of tubular mainshaft 54 is supported by a bearing assembly 76 on input shaft 52 for rotation relative thereto. Input clutch assembly 56 is operable in an applied state to couple mainshaft 54 for rotation with input shaft 52 and is further operable in a released state to permit relative rotation therebetween. Input clutch assembly 56 is shown to be a spring-released pressure-applied type of arrangement. Input clutch assembly 56 includes an annular drive hub 78 fixed to input shaft 52, a clutch drum 80 fixed to rotor 72, and a multi-plate clutch pack 82 therebetween. Clutch pack 82 includes a set of inner plates 84 splined to drive hub 78 and which are interleaved with a set of outer plates splined to drum 80. Clutch pack 82 is disposed between a reaction plate 88 splined to drum 80 and a piston 92.

Piston 92 is located between mainshaft 54 and clutch drum 80. Piston 92 is sealed between mainshaft 54 and drum 80 by inner and outer seal rings to define a pressure chamber 96 which is in fluid communication with a first pressure control valve 98 (see FIGS. 6 and 8) via a first flow pathway 100. A return spring 102 is located between piston 92 and a spring retainer 84 secured to mainshaft 54. Spring 102 functions to normally bias piston 92 toward rotor 72 for releasing clutch pack 82. In contrast, with clutch pack 82 engaged, input clutch assembly 56 is operating in its applied state and power from engine 12 and transmission 14 is transferred to mainshaft 54. When it is desired to shift input clutch assembly 56 into its applied state, a volume of high pressure fluid is delivered from first control valve 98 to pressure chamber 96 via first flow pathway 100 for causing piston 92 to move away from rotor 72 and return spring 102 to resiliently deflect. This action causes piston 92 to apply a frictional compressive clutch engagement force on clutch pack 82, thereby coupling drive hub 78 to drum 80 such that drive torque is transferred from input shaft 52 to mainshaft 54 through rotor 72. When it is desired to shift input clutch assembly 56 into its released state, first control valve 98 is controlled to vent pressure chamber 96 such that spring 102 moves piston 92 for releasing clutch pack 82.

With continued reference to FIG. 3, M/G unit 68 is shown to have wound stator 70 fixed to housing 50 and rotor 72 fixed to mainshaft 54. Rotor 72 includes an annular drive drum 110 that is fixed to mainshaft 54 and on which a series of magnetics 112 are connected. Electric cables 104 (see FIG. 6) are connected to stator 70 and extend through sealed apertures 106 in housing 50 for connection to battery 46 and controller 48 via suitable electrical connectors. Preferably, M/G unit 68 is a permanent magnet d.c. motor.

Figure 4:
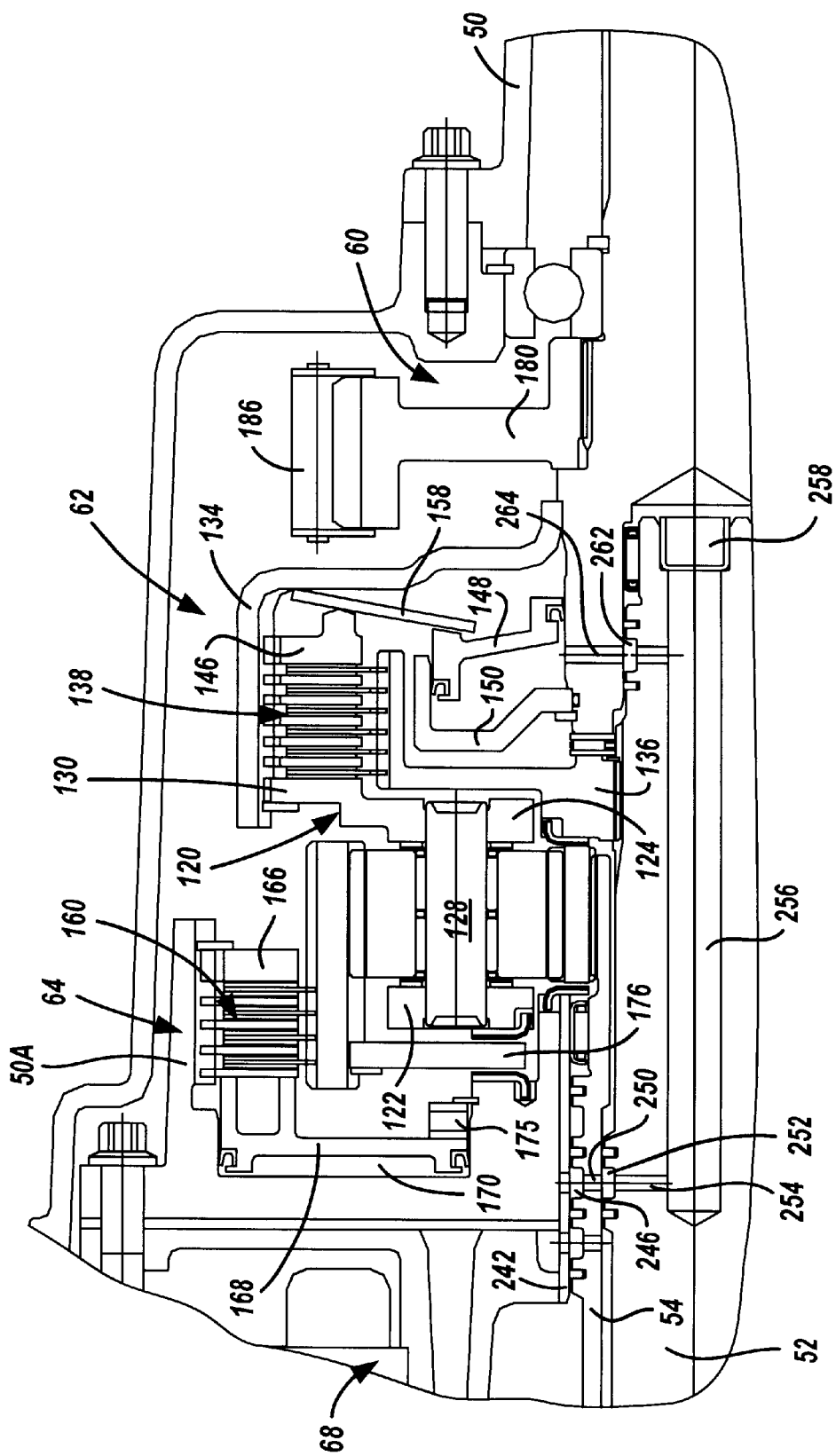
FIG. 4 is an enlarged partial sectional view of the transfer case showing the direct clutch assembly and low brake assembly that are operably for establishing high-range and low-range drive connections across the two-speed planetary gearset.

Referring primarily now to FIGS. 3 and 4, planetary gearset 58 is shown to include a sun gear 114 splined to the aft end of mainshaft 54, a ring gear 116, and a set of planet gears 118 supported from a carrier assembly 120. Carrier assembly 120 includes a first ring 122 and a second ring 124. Planet gears 118 are rotatably supported on pinion shafts 128 extending between rings 122 and 124 and are meshed with sun gear 114 and ring gear 116. Second ring 124 includes a reaction plate segment 130 that is associated with direct clutch assembly 62.

Direct clutch assembly 62 is a spring-apply pressure-release type of arrangement that is normally operable in an applied state to couple carrier assembly 120 for common rotation with input shaft 52. Direct clutch assembly 62 is further operable in a released state to permit relative rotation between input shaft 52 and carrier assembly 120. Direct clutch assembly 62 includes a drive hub 136 splined for rotation with input shaft 52 and a multi-plate clutch pack 138 disposed between drive hub 136 and a clutch drum 134 that is fixed for rotation with rear output shaft 30. Clutch pack 138 includes a set of inner plates splined to drive hub 136 and which are interleaved with a set of outer plates splined to drum 134. Clutch pack 138 is located between reaction plate segment 130 of carrier assembly 120 which is splined to drum 134, and an apply plate 146 also splined to drum 134. A piston 148 is supported between rear output shaft 30 and a piston housing 150 that is journalled on and sealed relative to rear output shaft 30. Piston 148 is sealed by inner and outer seal rings to define a pressure chamber 152 which is in fluid communication with a second pressure control valve 154 (FIGS. 6 and 8) via a second flow pathway 156. A bevel-type apply spring 158 is located within drum 134 and is in engagement with piston 148 and apply plate 146. Apply spring 158 acts as a lever arm and functions to normally bias piston 148 toward piston housing 150 for exerting a clutch engagement force on apply plate 146 of sufficient magnitude to compress clutch pack 138 and rotatively couple carrier assembly 120 to input shaft 52. With clutch pack 138 engaged, direct clutch assembly 62 is operating in its applied state and when clutch pack 138 is disengaged, direct clutch assembly 62 is operating in its released state. When it is desired to shift direct clutch assembly 62 into its released state, a volume of high pressure fluid is delivered from second control valve 154 to pressure chamber 152 via second flow pathway 156 for urging piston 148 to move away from piston housing 150 and cause apply spring 158 to resiliently deflect, thereby releasing apply plate 146 from clamped frictional engagement with clutch pack 138.

With continued reference to FIG. 4, low brake assembly 64 is shown to be a pressure-apply spring-release type of arrangement that is normally operable in a released state to permit rotation of ring gear 116 and is further operable in an applied state to prevent rotation of ring gear 116. Low brake assembly 64 includes a multi-plate clutch pack 160 that is disposed between housing 50 and ring gear 116. Clutch pack 160 includes a set of inner plates splined to ring gear 116 and which are interleaved with a set of outer plates splined to a hub extension 50A of housing 50. Clutch pack 160 is also located between a reaction plate 166 fixed to hub extension 50A and a piston 168 that is retained for sliding movement in a pressure chamber 170 defined by housing 50. Pressure chamber 170 is in fluid communication with a third pressure control valve 172 via a third flow pathway 174. Inner and outer seal rings are provided to seal piston 160 relative to the inner and outer wall surfaces of pressure chamber 170. A return spring 175 acts on piston 168 for normally urging it away from clutch pack 160 so as to maintain low brake assembly 64 in its released state. When it is desired to shift low brake assembly 64 into its applied state, a volume of high pressure hydraulic fluid is delivered from third control valve 172 to pressure chamber 170 via third flow pathway 174 for urging piston 168 to move into engagement with clutch pack 160 and exert a clutch engagement force thereon of sufficient magnitude to hold ring gear 116 against rotation. As seen, a support plate 176 is secured for rotation with ring gear 116 and is supported for rotation relative to both carrier assembly 120 and housing 50 via a pair of thrust washers. Transfer assembly 60 includes a drive sprocket 180 driven by rear output shaft 30, a driven sprocket 182 rotatably supported by bearings 184 on front output shaft 40, and a power chain 186 meshed therebetween.

To provide means for selectively transferring drive torque from transfer assembly 60 to front output shaft 40, transfer case 16 includes transfer clutch assembly 66. When transfer clutch assembly 66 is operating in a released state, all drive torque is delivered to rear output shaft 30 and the motor vehicle is defined to be operating in a two-wheel drive (2WD) mode. When transfer clutch assembly 66 is operating in a fully-applied state, drive torque is split between rear output shaft and front output shaft 40 to define a locked or part-time four-wheel drive (4WD-LOCKED) mode. An adaptive or on-demand four-wheel drive (4WD-AUTO) mode is provided by automatically controlling transfer clutch assembly 66 between its released and fully-engaged states so as to vary the torque split ratio between rear output shaft 30 and front output shaft 40 in the range between 100:0 and 50:50. Furthermore, by controlling coordinated actuation of direct clutch assembly 62 and low brake assembly 64, the three distinct drive modes defined above can be established with either of a high-range (i.e., direct drive) or a low-range (reduction drive) ratio drive connection between mainshaft 54 and carrier assembly 120.

Figure 5:
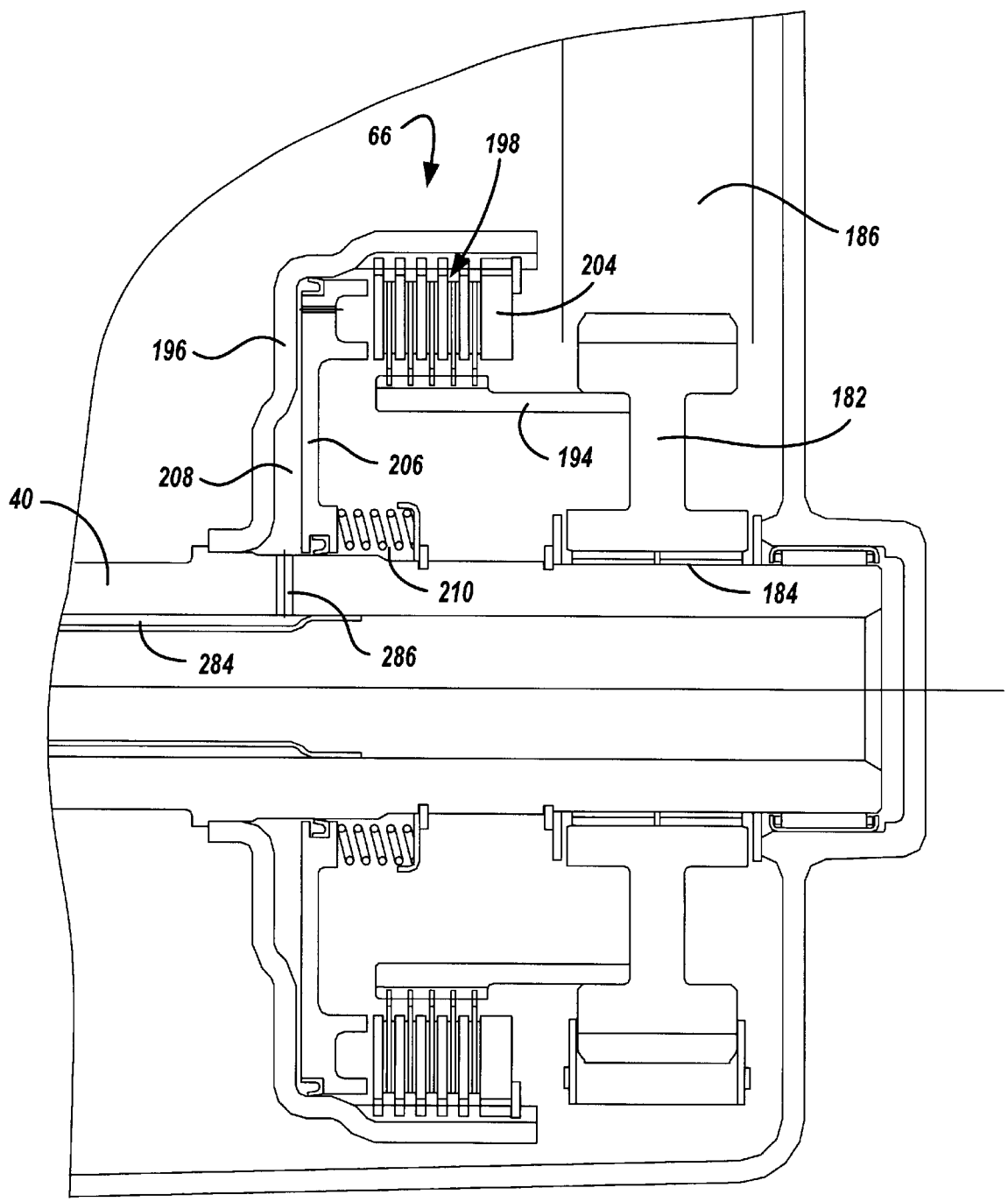
FIG. 5 is an enlarged partial sectional view of the transfer case showing the transfer clutch assembly in association with the front output shaft.
Figure 6:
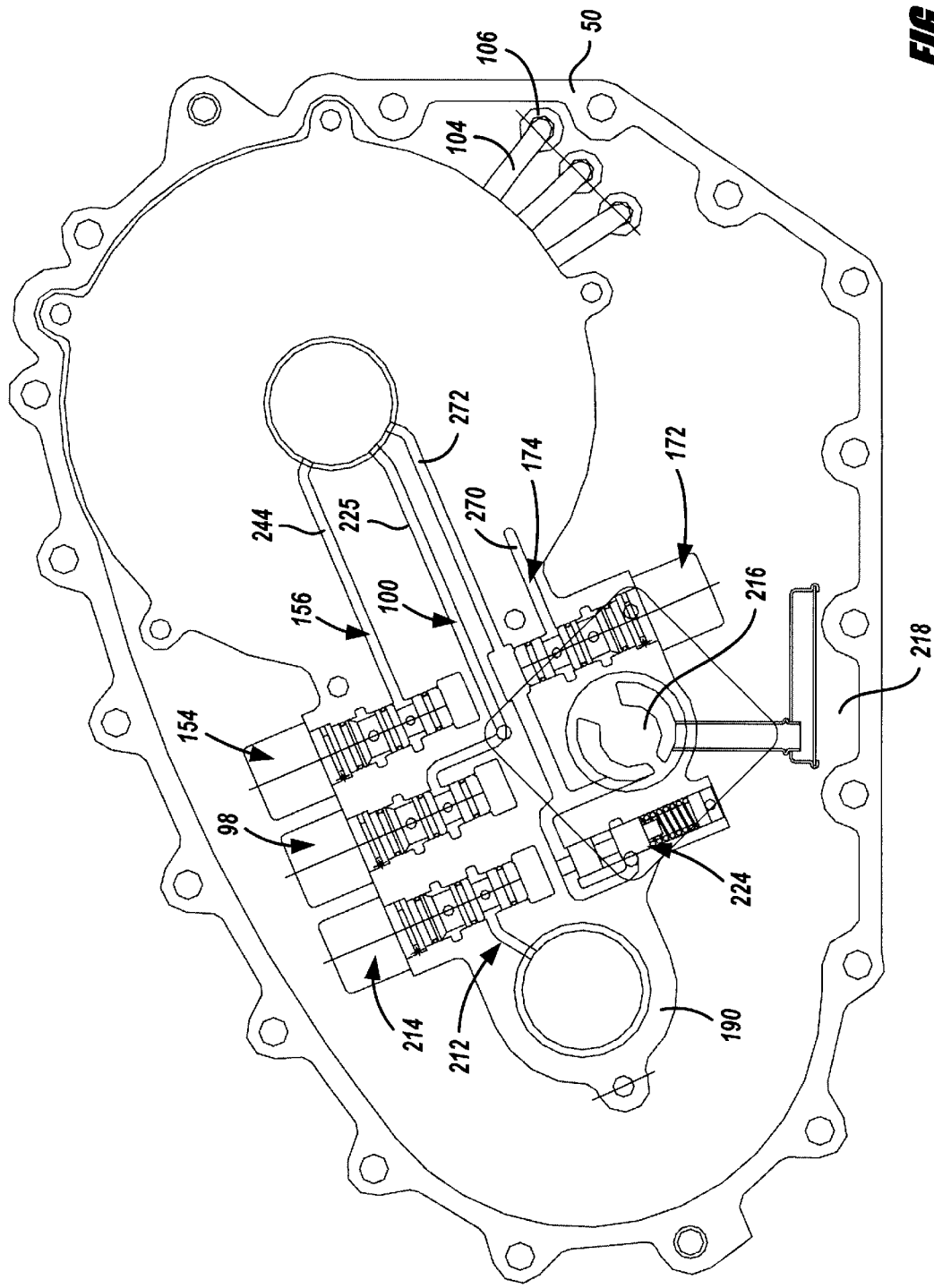
FIG. 6 is a view showing the mounting of the flow control valves inside the transfer case.
Figure 8:
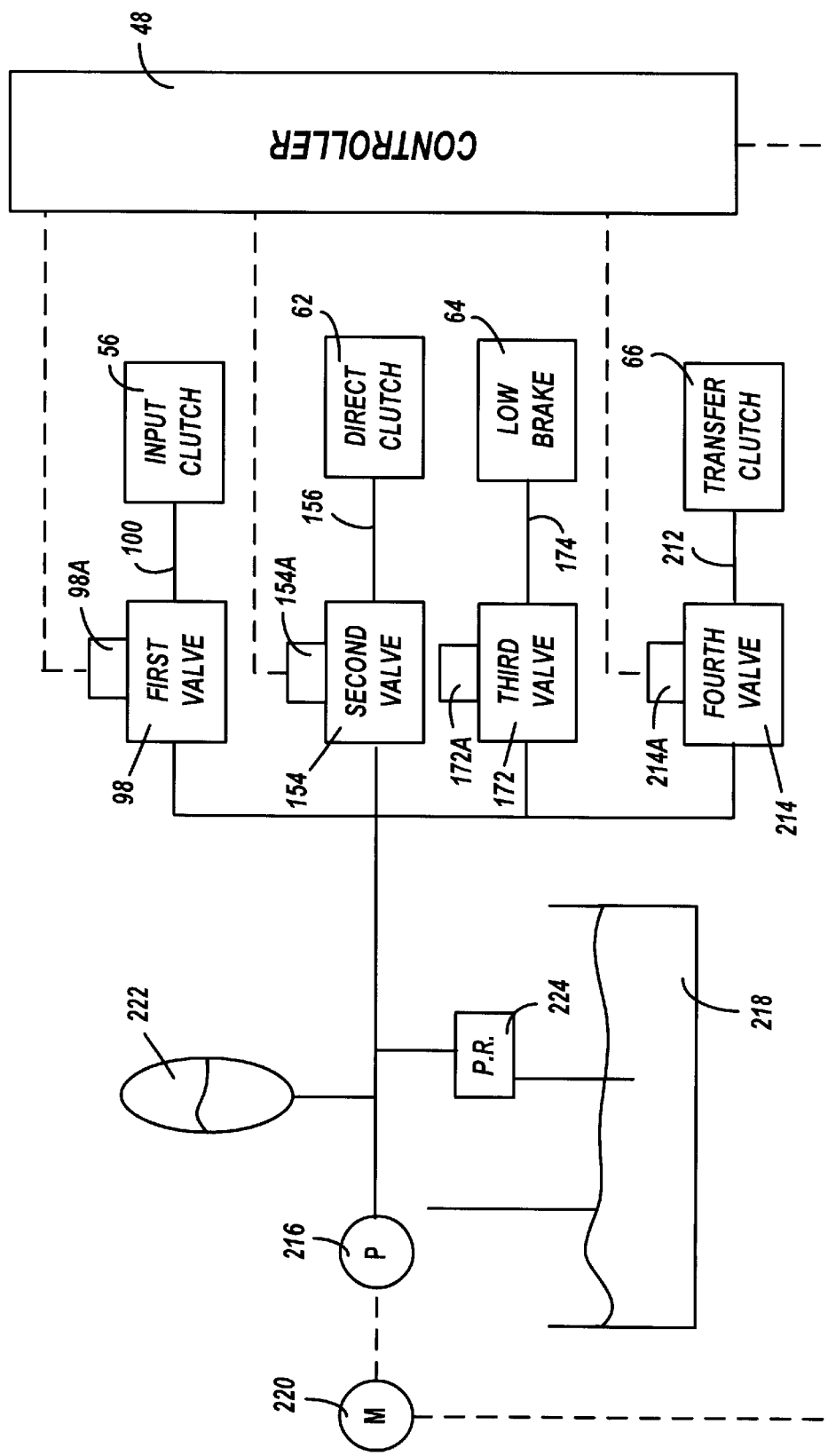
FIG. 8 is a schematic diagram of the hydraulic control system provided for controlling actuation of the various clutch and brake assemblies.

As best seen from FIG. 5, transfer clutch assembly 66 includes a drive hub 194 fixed to driven sprocket 182, a clutch drum 196 fixed to front output shaft 40, and a clutch pack 198 having inner plates splined to drive hub 194 which are interleaved with outer plates splined to clutch drum 196. A reaction plate 204 is also fixed to drum 196. A piston 206 is disposed in a pressure chamber 208 defined between front output shaft 40 and drum 196 and is sealed relative thereto by inner and outer seal rings. A return spring 210 acts on piston 206 to normally bias it away from clutch pack 198 such that transfer clutch assembly 66 is a spring-released pressure-applied arrangement normally operable in its released state. When it is desired to shift transfer case 16 from its two-wheel drive mode into either of its part-time or on-demand four-wheel drive modes, a volume of fluid is delivered to pressure chamber 208 through a fourth flow pathway 212 from a fourth pressure control valve 214 (FIGS. 6 and 8). The part-time four-wheel drive mode is established when a maximum fluid pressure is delivered to pressure chamber 208 such that a corresponding maximum clutch engagement force is exerted by piston 206 on clutch pack 198. In the on-demand four-wheel drive mode, the fluid pressure delivered to pressure chamber 208 is regulated so as to vary the corresponding clutch engagement force exerted by piston 206 on clutch pack 198, thereby varying the amount of drive torque transferred between driven sprocket 182 and front output shaft 40.

Figure 7:
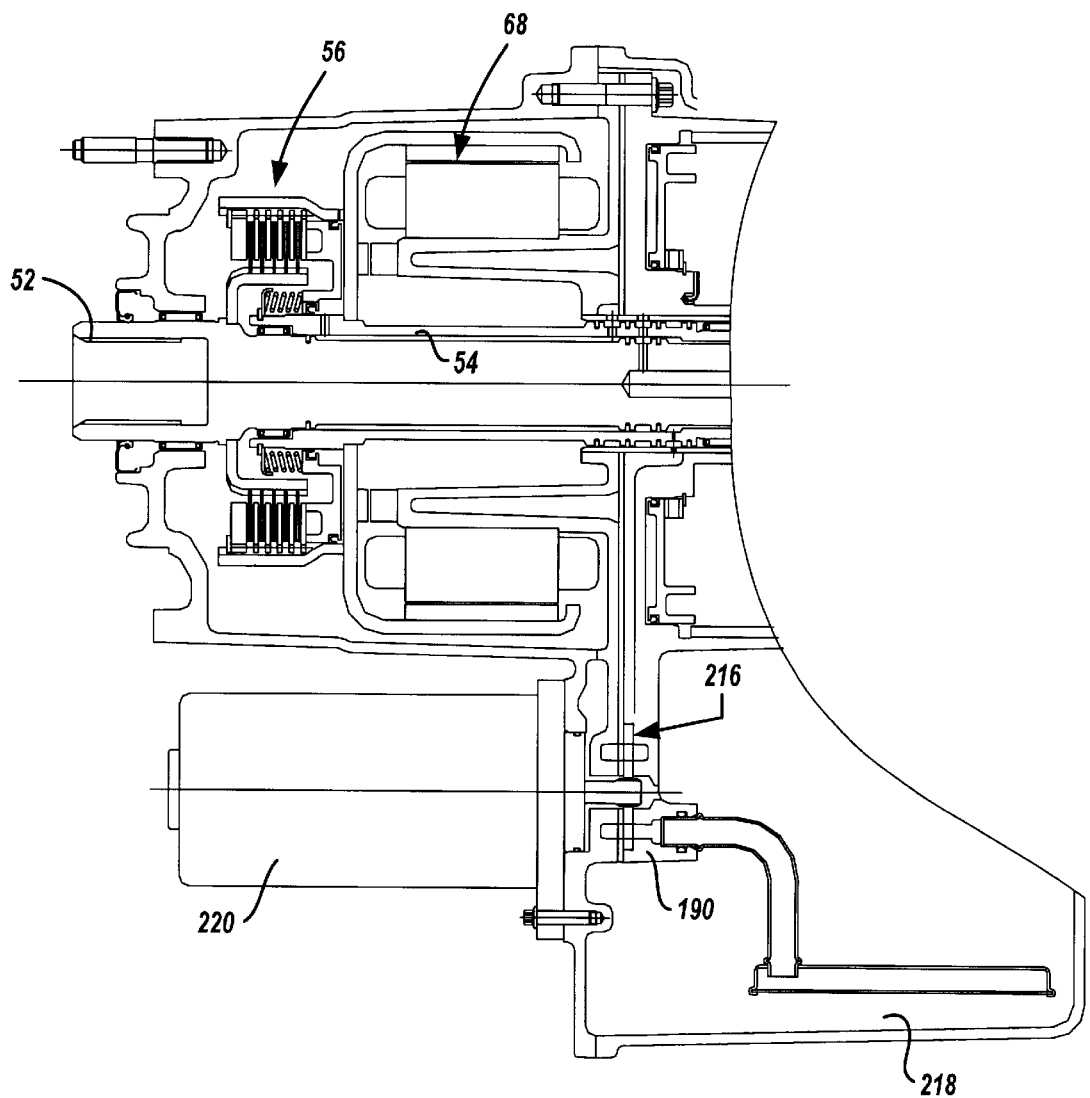
FIG. 7 is a partial sectional view showing the motor-driven pump associated with the hydraulic control system.

Referring now to FIGS. 6 through 8, the hydraulic clutch and brake control system associated with the present invention will be detailed. In particular, a pump 216, preferably of the gerotor type, draws hydraulic fluid from a reservoir or sump 218 provided within housing 50. A small electric motor 220 is provided to drive pump 216 for maintaining a desired fluid pressure in an internal accumulator 222 located at the inlet side of each of the control valves. A pressure regulator valve 224 is provided to maintain the desired fluid pressure downstream of accumulator 222. As previously disclosed, first control valve 98 is operable for controlling actuation of input clutch assembly 56, second control valve 154 is operable for controlling actuation of direct clutch assembly 62, third control valve 172 is operable for controlling actuation of low brake assembly 64, and fourth control valve 214 is operable for controlling actuation of transfer clutch assembly 66. Preferably, each control valve is a PWM type of electrohydraulic valve having a solenoid-operated driver 98A, 154A, 172A and 214A receiving an electric control signal from controller 48. In operation, second control valve 154 and third control valve 172 are used to define the high-range and low-range drive connections. Specifically, the direct ratio high-range drive connection is established with direct clutch assembly 62 in its applied state and low brake assembly 64 in its release state. In contrast, the low-range drive connection is established with direct clutch assembly 62 in its released state and low brake assembly 64 in its applied state. These two distinct drive ratio connections can be established whether mainshaft 54 is driven solely by M/G unit 68 (the electric mode) with input clutch assembly 54 released, or mainshaft 54 is driven by engine 12 alone (the engine mode), or in conjunction with some power assist from M/G unit 68 (the hybrid mode) with input clutch assembly 54 applied. Preferably, the reduction ratio established by planetary gearset 58 is in the range of 2.0 to 5.0 to 1.0 and, more preferably, is 3.42:1 for a particular vehicular application now contemplated.

As seen from FIG. 6, a valvebody assembly 190 is rigidly secured within housing 50 and functions to provide fluid communication pathways between the four control valves and their corresponding pressure chambers. The outlet of pump 216 communicates with an inlet chamber for each pressure control valve formed in valvebody 190. To this end, first flow pathway 100 includes a passage 225 which communicates with one or more radial ports 226 formed through mainshaft 54 and which provide fluid communication between pressure chamber 96 and a circumferential chamber 228 between input shaft 52 and mainshaft 54. A pair of laterally-spaced seal rings on opposite sides of chamber 228 provide a fluid-tight seal between input shaft 52 and mainshaft 54. Chamber 228 communicates with one or more radial ports 230 which, in turn, communicate with pressure chamber 96. As seen, a pair of seal rings are provided to seal a supply groove 236 formed in mainshaft 54 relative to valvebody 190. Radial ports 238 interconnect supply groove 236 to chamber 228. An apertured journal bearing or sleeve 242 is provided to support mainshaft 54 for rotation relative to valvebody 190.

To provide a fluid flow path between the outlet of second control valve 154 and pressure chamber 152 of direct clutch assembly 62, second flow pathway 156 includes a flow passage 244 formed in valvebody 190 which communicates with a circumferential groove 246 and plurality of radial ports 250 extending through mainshaft 54. Ports 250 communicate with a circumferential groove 252 formed in input shaft 52 and radial bores 254 permit fluid communication between groove 252 and a long central cavity 256 formed in input shaft 52 and sealed via end plug 258. Cavity 256 communicates with radial supply ports 260 and a supply groove 262 in input shaft 52 which, in turn, communicates with radial ports 264 in rear output shaft 30. Ports 264 communicate with pressure chamber 152. Seal rings are provided for sealing groove 246 relative to valvebody 190, for sealing groove 252 relative to mainshaft 54, and for sealing groove 262 relative to rear output shaft 30.

The outlet of third control valve 172 is in fluid communication with pressure chamber 170 of low brake assembly 64 via third flow pathway 174. Third flow pathway 174 includes a passage 270 formed in valvebody 190 which is in fluid communication with pressure chamber 170.

Fourth flow pathway 212 includes an annular circumferential chamber 280 formed in front output shaft 40 which is in fluid communication with the outlet of fourth control valve 210 via suitable flow passages formed in valvebody 190. Radial ports 282 provide communication between chamber 280 and a sealed central cavity 284 formed in front output shaft 40. A plurality of radial supply ports 286 formed through front output shaft 40 permit fluid flow between cavity 284 and pressure chamber 208. While not shown, it is understood that the fluid discharged from each of the control valves is returned to internal sump 218. As seen best in FIG. 6, a lube flow passage 272 is provided in valvebody 190 to provide lubrication to flow within transfer case 16.

The hybrid drive system of the present invention includes two drive power sources, namely internal combustion engine 12 and motor/generator 68. Power from engine 12 is transmitted to transmission 14 which, in turn, is delivered to transfer case 16 via the transmission output shaft. Transmission 14 can be of any known type (i.e., automatic, manual, automated manual, CVT) having a forward-reverse switching mechanism and a gearshift mechanism. Motor/generator 68 is connected to battery 46 and can be selectively placed in any of a DRIVE state, a CHARGING state, and a NO-LOAD or OFF state by controller 48. In the DRIVE state, motor/generator 68 functions as an electric motor which is driven by electric energy supplied from battery 46. In the CHARGING state, motor/generator 22 functions as an electric generator with regenerative braking (brake torque electrically generated by motor/generator 68) for storing electrical energy in battery 46. In the NO-LOAD state, the output (i.e., rotor 72) of motor/generator 68 is permitted to rotate freely.

Figure 10:
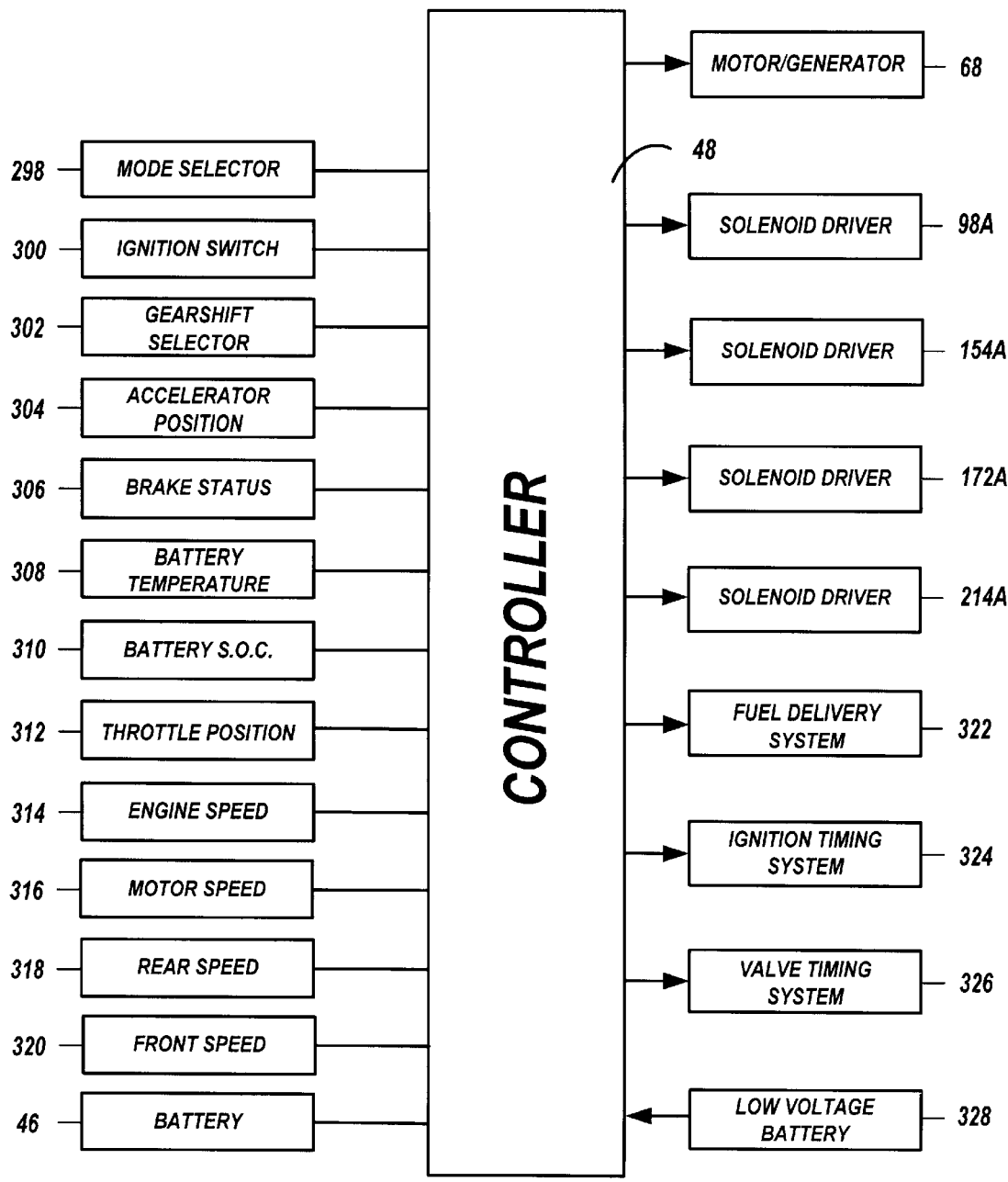
FIG. 10 is a chart showing the available modes of operation associated with hybrid powertrain of the present invention.

As noted, control system 42 is provided for controlling operation of the hybrid powertrain shown in FIG. 1. Referring to FIG. 10, controller 48 is shown to receive input signals from various sensors and input devices previously identified cumulatively in FIG. 1 as vehicle sensors 44. Controller 48 is principally comprised of a microcomputer having a central processing unit (CPU), random-access memory (RAM), read-only memory (ROM), and an input-output actuator interface. Controller 48 performs data processing operations to execute various control routines according to control programs and/or maps stored in the ROM. Controller 48 receives data from an ignition switch 300, a gearshift lever switch 302, an accelerator position sensor 304, a brake status switch 306, a battery temperature sensor 308, a battery SOC (state of charge) sensor 310, and a throttle position sensor 312. In addition, other inputs include an engine speed sensor 314, a motor speed sensor 316, a rear shaft speed sensor 318, and a front shaft speed sensor 320. Ignition switch 300 is closed when the vehicle key is turned on. Assuming transmission 14 is of an automatic type, then "P", "N", "R", and "D" switches in gearshift selector switch 302 are closed when the gearshift mechanism is located in its Park (P), Neutral (N), Reverse (R) and Drive (D) positions, respectively. Accelerator position sensor 304 senses the depression angle of an accelerator pedal. Brake status switch 306 is turned on when the brake pedal is depressed. Battery temperature sensor 308 senses the temperature of battery 46. Battery SOC sensor 310 senses the charge level of battery 26. Throttle position sensor 312 senses the degree of opening of the engine throttle valve. Engine speed sensor 314 senses a parameter indicative of the rotary speed of the drive shaft of engine 12. Motor speed sensor 316 senses a parameter indicative of the rotary speed of rotor 72 of motor/generator 68. Rear speed sensor 318 senses the rotary speed of either rear output shaft 30 or rear propshaft 28 and can further be used as an indication of vehicle speed. Front speed sensor 320 senses the rotary speed of either front output shaft 40 or front prop shaft 38.

A mode selector signal from a mode selector 298 controlled by the vehicle operator signals controller 48 of the desired drive mode (2WD, 4WD-LOCK or 4WD-AUTO) selected.

Based upon the operating information inputted to controller 48, a mode of operation of the hybrid powertrain is selected and controller 48 sends electric control signals to the various power-operated controlled devices. Specifically, controller 48 monitors and continuously controls actuation of motor/generator 68, solenoid driver 98A associated with input clutch assembly 56, solenoid driver 154A associated with direct clutch assembly 62 solenoid driver 172A associated with low brake assembly 64, and solenoid driver 214A associated with transfer clutch assembly 66. Additionally, controller 48 monitors and controls various engine management systems for controlling the speed and torque generated by engine 12. These include a fuel injection system 322, an ignition timing system 324, and a valve timing system 326. A low voltage auxiliary battery 328 may serve as the power supply for controller 48.

There are three modes of motive operation for the hybrid vehicle, namely: (a) an electric mode; (b) an engine mode; and (c) a hybrid mode; In addition, the hybrid vehicle is also capable of regenerative braking and power generation modes to optimize fuel economy and power consumption. FIG. 9 is a chart of the available drive modes associated with transfer case 16. In addition, the power flow paths for these drive modes are shown in FIGS. 11A through 11H. In the electric mode, only electric motor 68 provides motive power to the vehicle. In the hybrid mode, both engine 12 and electric motor 68 provide motive power to the vehicle. In the engine mode, only engine 12 provides motive power to the vehicle. In the regenerative and power generation modes, a portion of the engine power is absorbed by motor/generator 68 to charge battery 46. The transition from one mode to the next is smooth and transparent to the vehicle operator since controller 48 selects the most appropriate mode depending on various vehicle operating conditions including vehicle speed, accelerator demand and battery charge status.

Figure 11A:
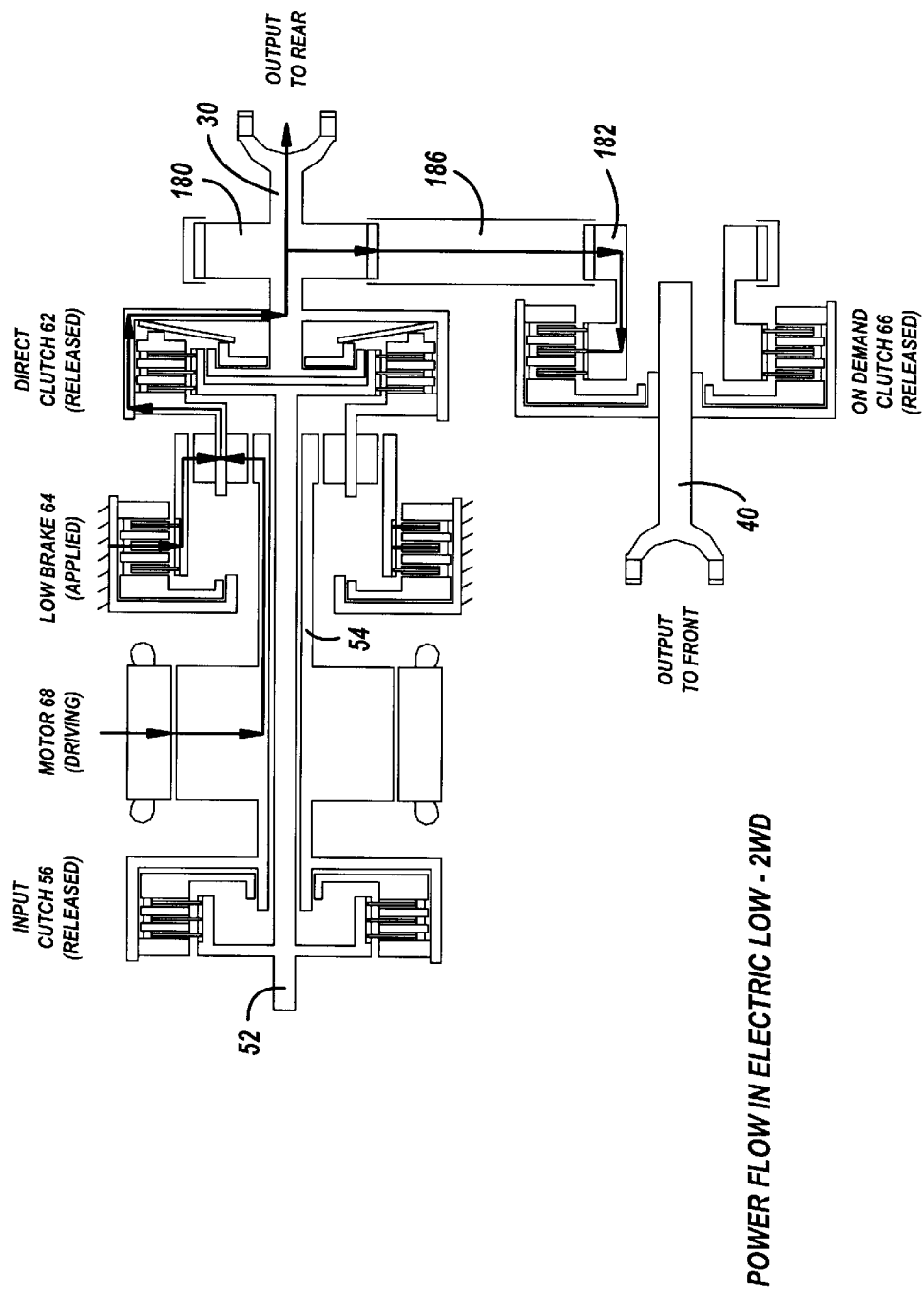

Typically, the hybrid vehicle would begin operation in the electric low-range mode with engine 12 stopped and input clutch assembly 56 and direct clutch assembly 64 released while low brake assembly 66 is applied. The power flow path for this mode is shown in FIG. 11A. Motor/generator 68 is then shifted into its DRIVING state such that electric power is supplied to motor/generator 68 for causing rotor 72 to drive mainshaft 54 and sun gear 114 of planetary gearset 58 which, in turn, drives carrier assembly 120 at a reduced speed ratio. Unless operation in a 4WD mode is immediately needed, transfer clutch assembly 66 would be released such that motor 68 delivers all drive torque to rear driveline 18. During operation in the electric low-range mode, it is contemplated that the vehicle may be driven up to about thirty miles per hour. This permits use of the electric mode in urban areas and stop and go driving so as to reduce the overall fuel consumption of the vehicle.

Figure 11B:
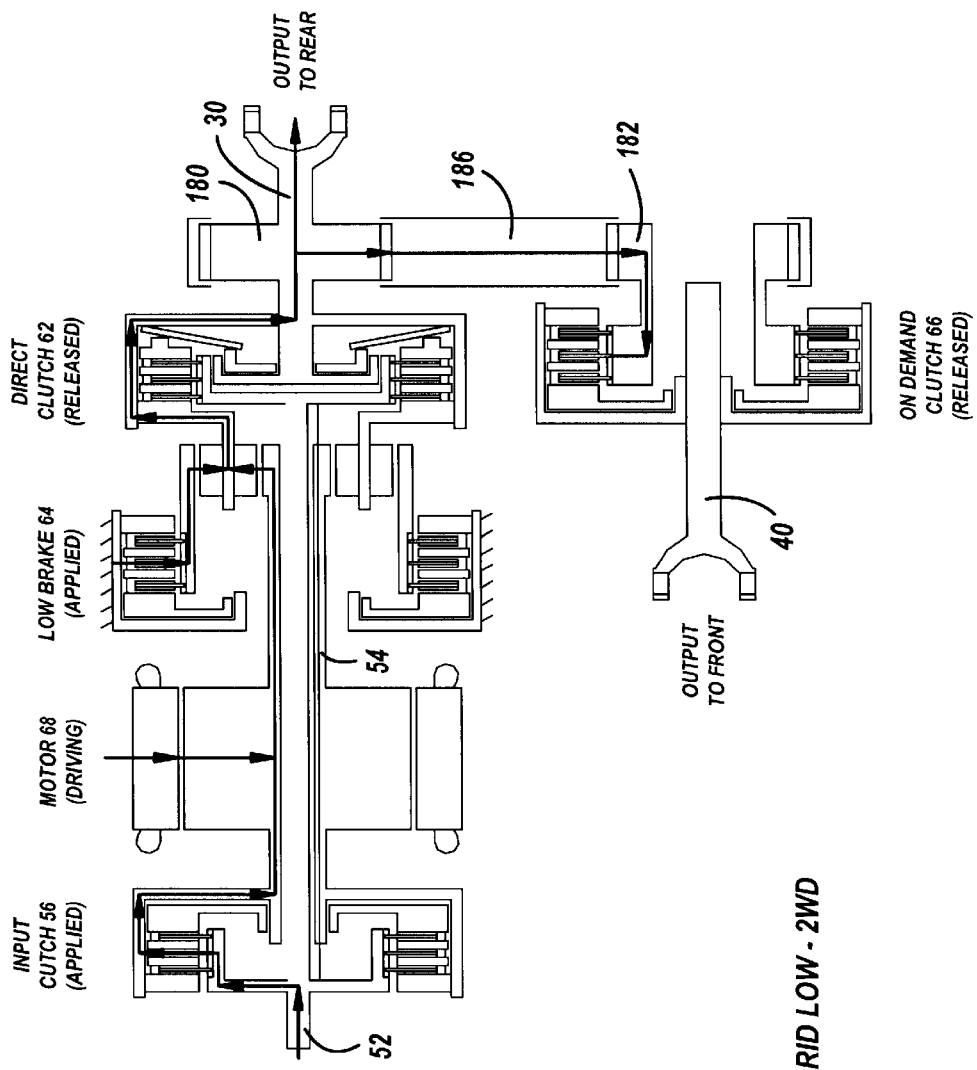

When shifting from the electric low-range mode into the hybrid low-range mode, motor/generator 68 can be used to start engine 12 (assuming a manual transmission) by engaging input clutch assembly 56 and increasing motor power. The power flow path for this mode is shown in FIG. 11B. With engine 12 running, and input clutch assembly 56 engaged, drum 80 is coupled for rotation with mainshaft 54. Thus, in the hybrid low-range mode, engine 12 and transmission 14 deliver power to rotor 72, while motor/generator 68 also delivers power to rotor 72, thereby providing a full range of power assist capability. Controller 48 controls engine torque via real-time control of the various engine management systems in conjunction with controlling the motor torque developed by motor/generator 68. Under light throttle conditions, motor/generator 68 may be optionally placed in its CHARGING state to recharge battery 26.

Figure 11C:
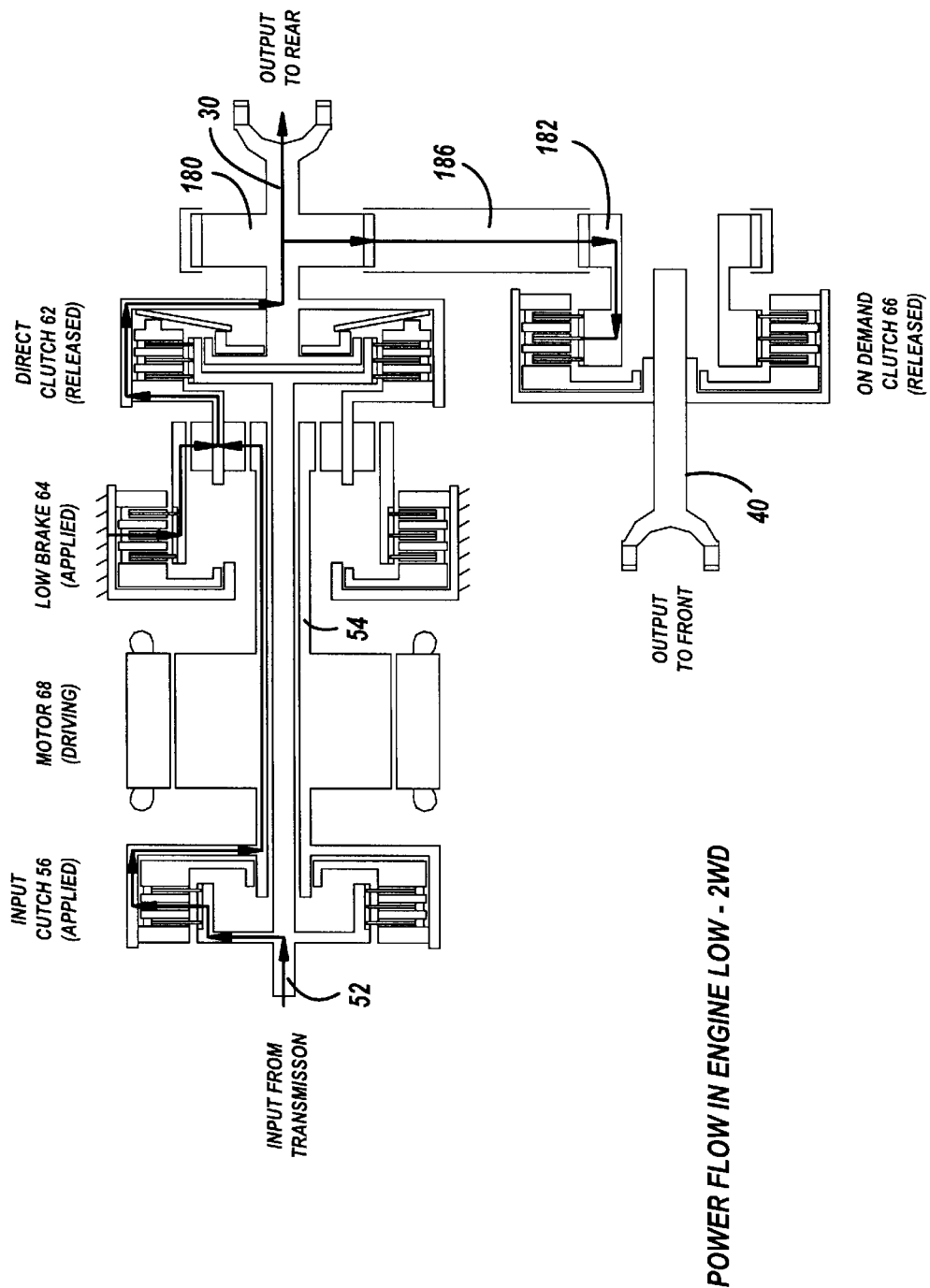

Thereafter, when the operating conditions of the vehicle warrant operation in the engine low-range mode, the hybrid drive system is switched by simply shifting motor/generator 68 into its no-load or OFF state and maintaining input clutch assembly 56 in its applied state. This power flow is shown in FIG. 11C. Alternately, motor/generator 68 can be shifted into its CHARGING state to provide regenerative braking.

In any of the electric, hybrid and engine modes of operation, motive power is delivered to both rear output shaft 30 and driven sprocket 182 of transfer assembly 60. Based on the particular drive mode selected (i.e., 2WD, 4WD-LOCK, 4WD-AUTO), controller 48 controls the actuated condition of transfer clutch 66. As such, various two-wheel drive and four-wheel drive modes are available at all times. Thus, the vehicle combines the commercially-successful features of a traditional four-wheel drive drivetrain architecture (engine, transmission and transfer case) with hybrid power control to significantly advance the hybrid drive technology. Moreover, the present invention provided an arrangement for a hybrid four-wheel drive vehicle which is not highly customized, but rather permits "drop-in" assembly of a hybrid transfer case in place of a conventional transfer case. This arrangement also permits the use of a smaller internal combustion engine that is sized for cruise operation while the electric assist of the motor/generator is capable of driving the vehicle at low speeds.

It is also contemplated that a power generation mode can be established with the motor vehicle stopped. This power flow path is shown in FIG. 11G. Specifically, with input clutch assembly 62 applied and both direct clutch assembly 64 and low brake assembly 66 released, engine 12 can drive motor/generator 68 to provide auxiliary power and/or charge battery 46. Since both are released, no torque is transferred from mainshaft 54 to carrier assembly 120 so rotation of mainshaft 54 can be used exclusively to provide the power generation mode.

Figure 11H:
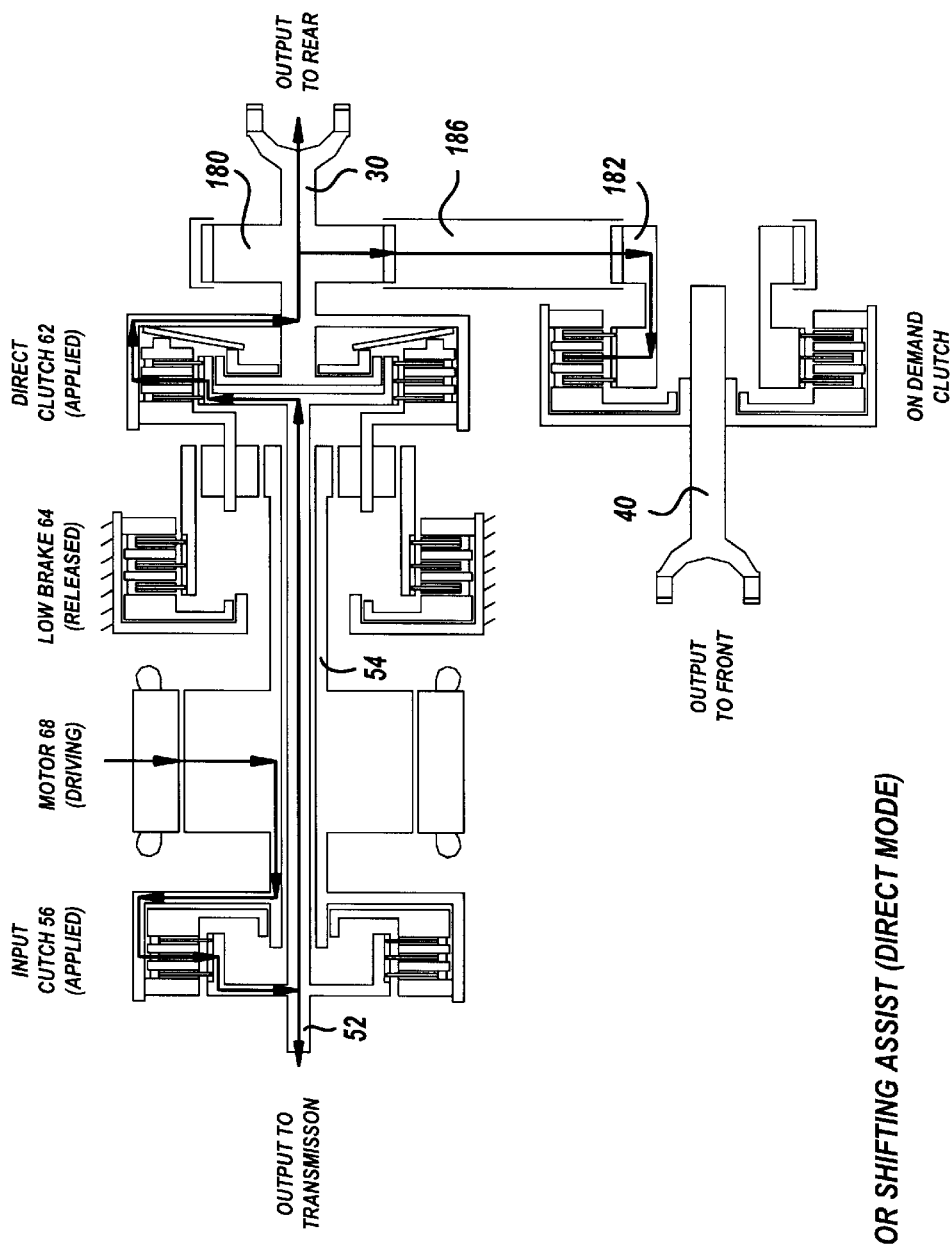

As shown in the power flow path of FIG. 11H, transfer case 16 is also capable of providing "powershift" assistance to manual transmission. In this mode, power from motor 68 is used to synchronize the geartrain in transmission 14 during sequential gear shifts. Transfer case 16 is shown to include a hydraulic power-operated clutch/brake actuation system since it can be accommodated within housing 50. However, it will be understood that an electromechanical clutch/brake actuation system using electromagnetic clutches can likewise be used. Also, transfer clutch 66 could be replaced with a mechanical locking-type (i.e., dog clutch) or a speed/torque sensitive coupling providing passive on-demand torque transfer (i.e., viscous couplings, hydraulic coupling, etc.).

A preferred embodiment of the invention has been disclosed to provide those skilled in the art an understanding of the best mode currently contemplated for the operation and construction of the four-wheel drive hybrid drive system. The invention being thus described, it will be obvious that various modifications can be made without departing from the true spirit and scope of the invention, and all such modifications as would be considered by those skilled in the art are intended to be included within the scope of the following claims.

What is claimed is:

1. A transfer case for use in a motor vehicle having an engine and first and second drivelines, comprising:

an input shaft adapted to be driven by the engine;

a mainshaft;

a first clutch for coupling said input shaft to said mainshaft;

a first output shaft adapted for connection to the first driveline;

a second output shaft adapted for connection to the second driveline;

a reduction unit having an input member driven by said mainshaft, a reaction member, and an output member driving said first output shaft;

a second clutch for coupling said input shaft to said output member of said reduction unit;

a third clutch for coupling said reaction member of said reduction unit to a stationary member; and an electric motor for selectively driving said mainshaft.

2. The transfer case of claim 1 wherein said first clutch is operable in a released state to release said mainshaft from driven engagement with said input shaft and is further operable in an applied state to couple said mainshaft for rotation with said input shaft, wherein said second clutch is operable in a released state to permit relative rotation between said output member and said input shaft and is further operable in an applied state to couple said output member for common rotation with said input shaft, and wherein said third clutch is operable in a released state to permit rotation of said reaction member and is further operable in an applied state to couple said reaction member to said stationary member.

3. The transfer case of claim 2 wherein a high-range drive connection is established between said input shaft and said output member when said second clutch is operating in its applied state and said third clutch is in its released state, and wherein a low-range drive connection is established between said mainshaft and said output member when said second clutch is in its released state and said third clutch is in its applied state.

4. The transfer case of claim 3 further comprising a fourth clutch for coupling said second output shaft to said first output shaft, wherein said fourth clutch is operable in a released state such that all drive torque is transferred from said output member to said first output shaft to define a two-wheel drive mode, and said fourth clutch is further operable in an applied state such that drive torque is transferred from said output member to both of said first and second output shafts to define a four-wheel drive mode.

5. The transfer case of claim 4 wherein a hybrid two-wheel high-range drive mode is established when said first clutch is applied, said second clutch is applied, said third clutch is released and said fourth clutch is released such that drive torque generated by said electric motor is combined with drive torque from the engine to drive said input shaft.

6. The transfer case of claim 4 wherein an engine two-wheel high-range drive mode is established when said first clutch is released, said second clutch is applied, said third clutch is released, said fourth clutch is released and said electric motor is off such that drive torque generated by the engine drives said input shaft.

7. The transfer case of claim 4 wherein an electric two-wheel low-range drive mode is established when said input clutch is released, said direct clutch is released, said low brake is applied, said transfer clutch is released, and said electric motor is activated to drive said mainshaft.

8. The transfer case of claim 4 wherein a hybrid two-wheel low-range drive mode is established when said first clutch is applied, said second clutch is released, said third clutch is applied and said fourth clutch is released such that drive torque generated by said electric motor is combined with drive torque from the engine to drive said mainshaft.

9. The transfer case of claim 4 wherein an engine two-wheel low-range drive mode is established when said FIRST clutch is applied, said SECOND clutch is released, said third clutch is applied, said fourth clutch is released and said electric motor is off such that drive torque generated by the engine drives said mainshaft.

10. The transfer case of claim 4 wherein an electric four-wheel low-range drive mode is established when said first clutch is released, said second clutch is released, said third clutch is applied, said fourth clutch is applied and said electric motor is activated to drive said mainshaft.

11. The transfer case of claim 4 wherein said fourth clutch can be fully engaged to define a locked four-wheel drive mode or actuation of said fourth clutch can be varied to define an on-demand four-wheel drive mode.

12. The transfer case of claim 4 wherein a hybrid four-wheel low-range drive mode is established when said first clutch is applied, said third clutch is applied, said second clutch is released, said fourth clutch is applied, and drive torque generated by said electric motor is combined with drive torque from the engine to drive said mainshaft.

13. The transfer case of claim 4 wherein a hybrid four-wheel high-range drive mode is established when said first clutch is applied, said second clutch is applied, said third clutch is released, said fourth clutch is applied and drive torque generated by said electric motor is combined with drive torque from the engine to drive said input shaft.

14. The transfer case of claim 4 wherein an engine four-wheel high-range drive mode is established when said first clutch is applied, said second clutch is applied, said third clutch is released, said fourth clutch is applied and said electric motor is off such that drive torque generated by the engine drives said input shaft.

15. The transfer case of claim 4 wherein said first clutch is a multi-plate clutch assembly operable disposed between said input shaft and said mainshaft, said first clutch can be selectively shifted between its released and applied states via actuation of a first power-operated actuator controlled by a control system.

16. The transfer case of claim 15 wherein said second clutch is a multi-plate clutch assembly operably disposed between said input shaft and said output member, said second clutch can be selectively shifted between its released and applied states via actuation of a second power-operated actuator controlled by said control system.

17. The transfer case of claim 16 wherein said third clutch is a multi-plate brake assembly operably disposed between said reaction member and said stationary member, said third clutch can be selectively shifted between its released state and its applied state via actuation of a third power-operated actuator.

18. The transfer case of claim 17 wherein said fourth clutch is a multi-plate clutch assembly operably disposed between said first output shaft and said second output shaft, said fourth clutch can be selectively shifted between its applied and released states via actuation of a fourth power-operated actuator.

19. The transfer case of claim 18 wherein said control system includes a controller and sensors for detecting operating characteristics of the vehicle and sending sensor signals to said controller, said controller operable to send control signals to said electric motor and to each of said first, second, third and fourth actuators.

20. A transfer case for use in a motor vehicle having an engine and first and second drivelines, comprising:

an input shaft adapted to be driven by the engine;

a mainshaft;

a first clutch for selectively coupling said input shaft to said mainshaft;

a first output shaft adapted for connection to the first driveline;

a second output shaft adapted for connection to the second driveline;

a reduction unit driven by said mainshaft and having an output member operably connected to said first output shaft;

a second clutch for selectively coupling said input shaft to said output member;

an electric motor for selectively driving said mainshaft; and a control system for controlling actuation of said first clutch, said second clutch and said electric motor.

21. The transfer case of claim 20 further comprising a third clutch for transfer drive torque from said first output shaft to said second output shaft.

22. The transfer case of claim 21 wherein said control system is further operable to control actuation of said third clutch.

23. The transfer case of claim 20 wherein said second clutch includes a clutch drum fixed to said first output shaft, a hub fixed to said input shaft, and a clutch pack disposed between said clutch drum and hub.

24. The transfer case of claim 20 further comprising:

a valvebody supporting a first electrohydraulic valve controlling actuation of said first clutch, and a second electrohydraulic valve controlling actuation of said second clutch; and a hydraulic circuit providing high pressure fluid to said first, and second valves.

25. The transfer case of claim 20 further comprising a third clutch for selectively coupling a reaction member of said reduction unit to a stationary component, and wherein said control system is operable for controlling actuation of said third clutch.

26. A hybrid motor vehicle, comprising:

a powertrain including an internal combustion engine and a transmission;

a first driveline including a first axle driving a pair of first wheels;

a second driveline including a second axle driving a pair of second wheels;

a transfer case including an input shaft driven by said powertrain, a mainshaft, a first clutch for selectively coupling said input shaft to said mainshaft, a first output shaft operably connected to said first driveline, a second output shaft operably connected to said second driveline, a reduction unit having an input member driven by said mainshaft, a reaction member, and an output member fixed to said first output shaft, a second clutch for selectively coupling said input shaft to said first output shaft, a third clutch for selectively coupling said reaction member to a stationary component, and an electric motor for driving said mainshaft; and a control system for controlling actuation of said first clutch, said second clutch, said third clutch and said electric motor for defining an electric drive mode, a hybrid drive mode and a powertrain drive mode.

27. The hybrid motor vehicle of claim 26 wherein said first clutch is operable in a released state to release said mainshaft from driven engagement with said input shaft and is further operable in an applied state to couple said mainshaft for rotation with said input shaft, wherein said second clutch is operable in a released state to permit relative rotation between said input shaft and said first output shaft and is further operable in an applied state to couple said first output shaft for rotation with said input shaft, and wherein said third clutch is operable in a released state to permit rotation of said reaction member and is further operable in an applied state to brake said reaction member.

28. The hybrid motor vehicle of claim 27 wherein a high-range drive connection is established when said second clutch is operating in its applied state and said third clutch is in its released state, and wherein a low-range drive connection is established when said second clutch is in its released state and said third clutch is in its applied state.

29. The hybrid motor vehicle of claim 28 further comprising a fourth clutch operably disposed between said first output shaft and said second output shaft, and wherein said fourth clutch is operable in a released state such that all drive torque is transferred from said input shaft to said first output shaft to define a two-wheel drive mode, said fourth clutch is further operable in an applied state such that drive torque is transferred to both of said first and second output shafts to define a four-wheel drive mode.

30. The hybrid motor vehicle of claim 29 wherein a hybrid two-wheel high-range drive mode is established when said first clutch is applied, said second clutch is applied, said third clutch is released, said fourth clutch is released, and drive torque generated by said electric motor is combined with drive torque from the engine to drive said input shaft.

31. The hybrid motor vehicle of claim 29 wherein an engine two-wheel high-range drive mode is established when said first clutch is released, said second clutch is applied, said third clutch is released, said fourth clutch is released and said electric motor is off such that drive torque generated by the engine drives said input shaft.

32. The hybrid motor vehicle of claim 29 wherein an electric two-wheel low-range drive mode is established when said first clutch is released, said second clutch is released, said third clutch is applied, said fourth clutch is released and said electric motor is activated to drive said mainshaft.

33. The hybrid motor vehicle of claim 29 wherein a hybrid two-wheel low-range drive mode is established when said first clutch is applied, said second clutch is released, said third clutch is applied, said fourth clutch is released and drive torque generated by said electric motor is combined with drive torque from the engine to drive said mainshaft.

34. The hybrid motor vehicle of claim 29 wherein an engine two-wheel low-range drive mode is established when said first clutch is applied, said second clutch is released, said third clutch is applied, said fourth clutch is released and said electric motor is off such that drive torque generated by the engine drives said mainshaft.

35. The transfer case of claim 29 wherein an electric four-wheel low-range drive mode is established when said first clutch is released, said second clutch is released, said third clutch is applied, said fourth clutch is applied and said electric motor is activated to drive said mainshaft.

36. The hybrid motor vehicle of claim 35 wherein said fourth clutch can be fully engaged to define a locked four-wheel drive mode or actuation of said fourth clutch can be varied to define an on-demand four-wheel drive mode.

37. The hybrid motor vehicle of claim 29 wherein a hybrid four-wheel high-range drive mode is established when said first clutch is applied, said second clutch is applied, said third clutch is released, said fourth clutch is applied and drive torque generated by said electric motor is combined with drive torque from the engine to drive said input shaft.

38. The hybrid motor vehicle of claim 29 wherein an engine four-wheel high-range drive mode is established when said first clutch is released, said second clutch is applied, said third clutch is released, said fourth clutch is applied, and said electric motor is off such that drive torque generated by the engine drives said input shaft.

39. The hybrid motor vehicle of claim 29 wherein said input member is a sun gear, said reaction member is a ring gear, and said output member is a carrier having pinion gears meshed with said ring gear and said sun gear.

* * * * *